(12) United States Patent
Lepisto et al.

(10) Patent No.: US 8,762,276 B2
(45) Date of Patent: Jun. 24, 2014

(54) METHOD AND APPARATUS FOR UTILIZING RECOGNITION DATA IN CONDUCTING TRANSACTIONS

(75) Inventors: Jukka Tapani Lepisto, Oulu (FI); Panu Kyosti Kanervo, Oulu (FI); Matti Raty, Espoo (FI); Alexander Savin, Espoo (FI); Jani Niittukari, Espoo (FI); Turkka Jalmanen, Vantaa (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/339,152

(22) Filed: Dec. 28, 2011

(65) Prior Publication Data

US 2013/0173466 A1 Jul. 4, 2013

(51) Int. Cl.
*G06Q 40/00* (2012.01)

(52) U.S. Cl.
CPC .................................. *G06Q 40/00* (2013.01)
USPC .................. 705/44; 705/35; 705/39; 705/67; 705/75

(58) Field of Classification Search
None
See application file for complete search history.

(56) References Cited

U.S. PATENT DOCUMENTS

| | | | | | |
|---|---|---|---|---|---|
| 6,105,010 | A * | 8/2000 | Musgrave | | 705/44 |
| 6,615,191 | B1 * | 9/2003 | Seeley | | 705/54 |
| 6,871,287 | B1 * | 3/2005 | Ellingson | | 726/9 |
| 7,505,931 | B2 * | 3/2009 | Da Silva | | 705/35 |
| 7,516,886 | B2 * | 4/2009 | Gangi | | 235/380 |
| 7,599,522 | B2 * | 10/2009 | Ito | | 382/115 |
| 7,690,032 | B1 * | 3/2010 | Peirce | | 726/9 |
| 7,828,208 | B2 * | 11/2010 | Gangi | | 235/380 |
| 7,949,587 | B1 * | 5/2011 | Morris et al. | | 705/35 |
| 7,970,677 | B1 * | 6/2011 | Oakes et al. | | 705/35 |
| 8,190,517 | B1 * | 5/2012 | Baker et al. | | 705/39 |
| 8,214,652 | B2 * | 7/2012 | LaCous | | 713/186 |
| 8,311,973 | B1 * | 11/2012 | Zadeh | | 706/62 |
| 8,458,465 | B1 * | 6/2013 | Stern et al. | | 713/166 |
| 2002/0023059 | A1 * | 2/2002 | Bari et al. | | 705/76 |
| 2002/0083022 | A1 * | 6/2002 | Algazi | | 705/408 |
| 2002/0091537 | A1 * | 7/2002 | Algazi | | 705/1 |
| 2002/0095386 | A1 * | 7/2002 | Maritzen et al. | | 705/64 |
| 2002/0143588 | A1 * | 10/2002 | Ishigami et al. | | 705/5 |
| 2002/0152123 | A1 * | 10/2002 | Giordano et al. | | 705/14 |
| 2002/0194122 | A1 * | 12/2002 | Knox et al. | | 705/39 |
| 2003/0065626 | A1 * | 4/2003 | Allen | | 705/76 |
| 2003/0074568 | A1 * | 4/2003 | Kinsella et al. | | 713/186 |
| 2003/0217276 | A1 * | 11/2003 | LaCous | | 713/186 |
| 2004/0128249 | A1 * | 7/2004 | Hoffman | | 705/44 |
| 2005/0021983 | A1 * | 1/2005 | Arnouse | | 713/186 |
| 2005/0033991 | A1 * | 2/2005 | Crane | | 713/201 |
| 2005/0144136 | A1 * | 6/2005 | Murashita | | 705/51 |
| 2005/0192874 | A1 * | 9/2005 | Grear et al. | | 705/30 |
| 2005/0216340 | A1 * | 9/2005 | Schneider et al. | | 705/14 |
| 2005/0234742 | A1 * | 10/2005 | Hodgdon | | 705/2 |
| 2005/0278197 | A1 * | 12/2005 | Podczerwinski et al. | | 705/3 |
| 2007/0003111 | A1 * | 1/2007 | Awatsu et al. | | 382/115 |
| 2007/0022303 | A1 * | 1/2007 | Awatsu et al. | | 713/186 |

(Continued)

OTHER PUBLICATIONS

Notification of Transmittal of the International Search Report and the Written Opinion of the International Searching Authority, or the Declaration for International Application No. PCT/FI2012/051020 dated Feb. 7, 2013, pp. 1-15.

*Primary Examiner* — Gregory Johnson
(74) *Attorney, Agent, or Firm* — Ditthavong Mori & Steiner, P.C.

(57) ABSTRACT

An approach is provided for utilizing recognition data in conducting service transactions.

20 Claims, 17 Drawing Sheets

(56) References Cited

U.S. PATENT DOCUMENTS

| | | | |
|---|---|---|---|
| 2007/0234067 A1* | 10/2007 | Nanavati et al. | 713/186 |
| 2007/0257103 A1* | 11/2007 | Fisher et al. | 235/380 |
| 2007/0288320 A1* | 12/2007 | Cooper et al. | 705/16 |
| 2008/0040274 A1* | 2/2008 | Uzo | 705/44 |
| 2008/0041942 A1* | 2/2008 | Aissa | 235/382 |
| 2008/0065495 A1* | 3/2008 | Nguyen | 705/14 |
| 2008/0154623 A1* | 6/2008 | Derker et al. | 705/1 |
| 2008/0177635 A1* | 7/2008 | Handel | 705/26 |
| 2008/0177662 A1 | 7/2008 | Smith et al. | |
| 2008/0271116 A1* | 10/2008 | Robinson et al. | 726/2 |
| 2008/0313086 A1* | 12/2008 | Milgramm | 705/55 |
| 2009/0006239 A1* | 1/2009 | Robinson et al. | 705/35 |
| 2009/0064302 A1* | 3/2009 | Colella | 726/9 |
| 2009/0099944 A1* | 4/2009 | Robinson et al. | 705/30 |
| 2009/0132381 A1* | 5/2009 | Gangi | 705/18 |
| 2009/0307139 A1 | 12/2009 | Mardikar et al. | |
| 2010/0008535 A1* | 1/2010 | Abulafia et al. | 382/100 |
| 2010/0011428 A1* | 1/2010 | Atwood et al. | 726/7 |
| 2010/0100479 A1* | 4/2010 | Rosenfield et al. | 705/39 |
| 2010/0115114 A1* | 5/2010 | Headley | 709/229 |
| 2010/0204616 A1* | 8/2010 | Shears et al. | 600/595 |
| 2010/0223179 A1* | 9/2010 | Mergenthaler | 705/38 |
| 2011/0119141 A1 | 5/2011 | Hoyos et al. | |
| 2011/0145152 A1* | 6/2011 | McCown | 705/67 |
| 2011/0251956 A1* | 10/2011 | Cantley et al. | 705/43 |
| 2011/0288874 A1* | 11/2011 | Hinkamp | 705/1.1 |
| 2012/0069131 A1* | 3/2012 | Abelow | 348/14.01 |
| 2012/0143760 A1* | 6/2012 | Abulafia et al. | 705/44 |
| 2012/0148115 A1* | 6/2012 | Birdwell et al. | 382/116 |
| 2013/0036480 A1* | 2/2013 | Anderson et al. | 726/30 |
| 2013/0117832 A1* | 5/2013 | Gandhi et al. | 726/7 |
| 2013/0173466 A1* | 7/2013 | Lepisto et al. | 705/44 |
| 2013/0212655 A1* | 8/2013 | Hoyos et al. | 726/5 |

\* cited by examiner

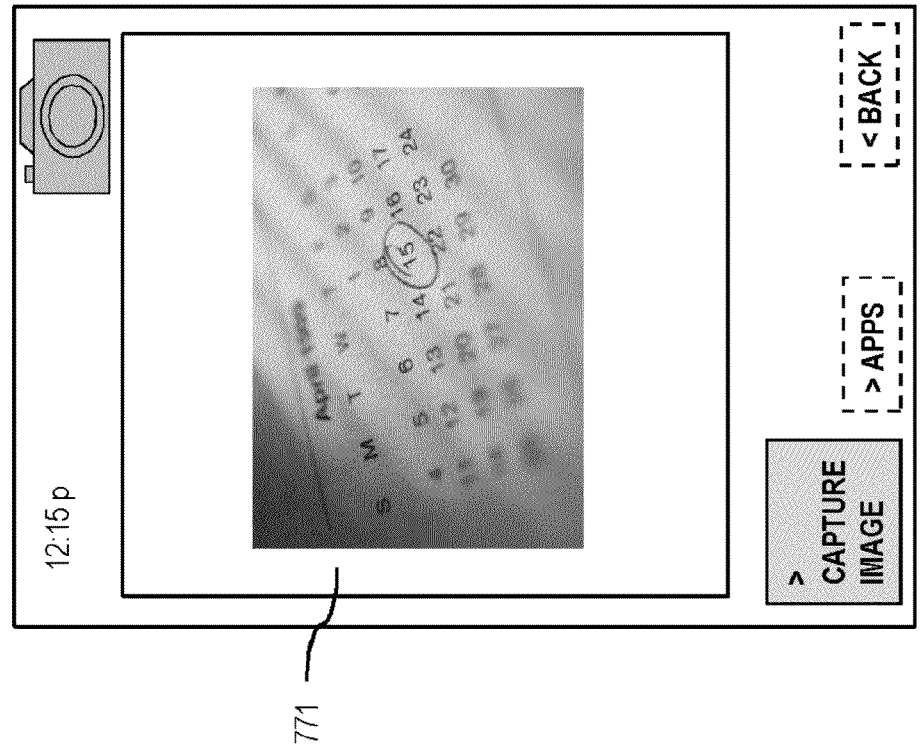
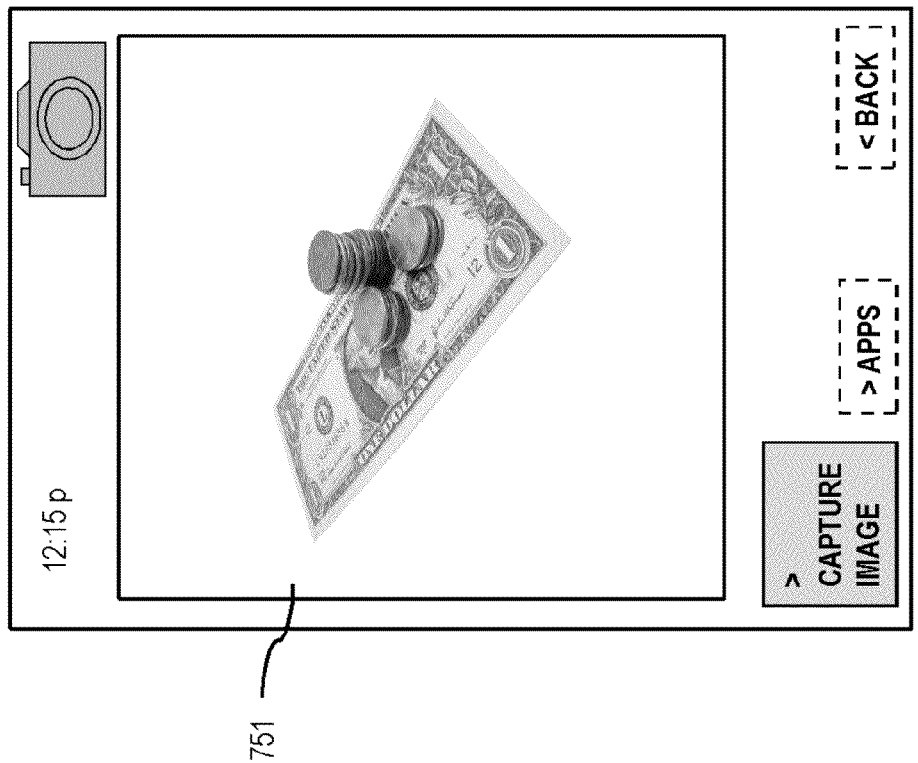
FIG. 7D

METHOD AND APPARATUS FOR UTILIZING RECOGNITION DATA IN CONDUCTING TRANSACTIONS

BACKGROUND

Service providers and device manufacturers (e.g., wireless, cellular, etc.) are continually challenged to deliver value and convenience to consumers by, for example, providing compelling network services. One area of interest has been the development of online services where users utilize various service providers to obtain various services and goods, and/or conduct any number of transactions. For example, a user may conduct transactions to purchase goods online from various vendors and ask for the goods to be shipped to the user's address of choice. In another example, the user may access and/or download various user applications, digital media and/or services such as online banking and other financial services. Generally, to conduct these transactions, users typically have to enter any number of parameters (e.g., transaction participants, desired items, payment amounts, account information, etc.). However, providing such input can be cumbersome or otherwise burdensome for a user, particularly when attempting to enter these parameters on a device with limited input/output capabilities such as a mobile phone or if the user has limited literacy. Accordingly, service providers and device manufactures face significant technical challenges in providing easy mechanisms for users to access online services and conduct transactions within the services.

Some Example Embodiments

Therefore, there is a need for an approach for utilizing recognition data (e.g., facial recognition) to specify parameters for conducting service transactions (e.g., financial transactions such as sending money to target recipients).

According to one embodiment, a method comprises determining a request from a user to designate at least one parameter of one or more transactions, wherein the request includes, at least in part, one or more biometric samples associated with the at least one parameter. The method also comprises processing and/or facilitating a processing of the one or more biometric samples to cause, at least in part, a recognition of the at least one parameter. The method further comprises causing, at least in part, an initiation of the one or more transactions based, at least in part, on the recognition.

According to another embodiment, an apparatus comprising at least one processor, and at least one memory including computer program code, the at least one memory and the computer program code configured to, with the at least one processor, cause, at least in part, the apparatus to determine a request from a user to designate at least one other user as at least one target of one or more transactions, wherein the request includes, at least in part, one or more biometric samples associated with the at least one parameter. The apparatus is further caused to process and/or and facilitate a processing of the one or more biometric samples to cause, at least in part, a recognition of the at least one parameter. Additionally, the apparatus is caused to cause, at least in part, an initiation of the one or more transactions based, at least in part, on the recognition.

According to another embodiment, a computer-readable storage medium carrying one or more sequences of one or more instructions which, when executed by one or more processors, cause, at least in part, an apparatus to, at least in part, determine a request from a user to designate at least one other user as at least one target of one or more transactions, wherein the request includes, at least in part, one or more biometric samples associated with the at least one parameter. The apparatus is further caused to process and/or and facilitate a processing of the one or more biometric samples to cause, at least in part, a recognition of the at least one parameter. Additionally, the apparatus is caused to cause, at least in part, an initiation of the one or more transactions based, at least in part, on the recognition. According to another embodiment, an apparatus comprises means for comprises determining a request from a user to designate at least one parameter of one or more transactions, wherein the request includes, at least in part, one or more biometric samples associated with the at least one parameter. The apparatus also comprises means for processing and/or facilitating a processing of the one or more biometric samples to cause, at least in part, a recognition of the at least one parameter. The apparatus further comprises means for causing, at least in part, an initiation of the one or more transactions based, at least in part, on the recognition.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 7A-7E show renderings of user interfaces utilized in inputting one or more parameters for one or more transactions, according to various embodiments;

DESCRIPTION OF SOME EMBODIMENTS

Examples of a method, apparatus, and computer program for utilizing recognition data in conducting service transactions are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
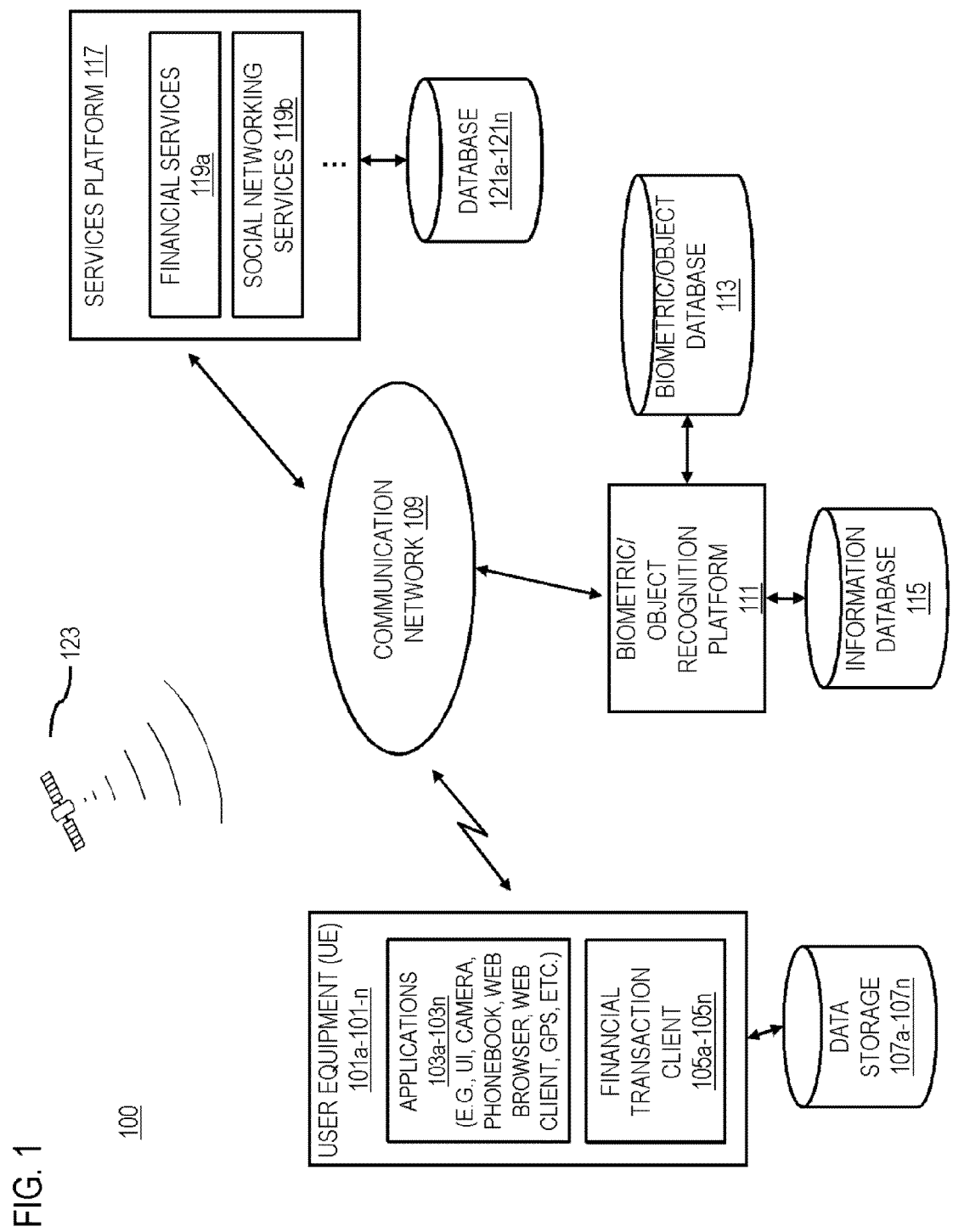
FIG. 1 is a diagram of a system capable of utilizing recognition data in conducting service transactions, according to one embodiment.

FIG. 1 is a diagram of a system capable of for utilizing recognition data in conducting service transactions, according to one embodiment. As discussed above, a broad range of services, transactions, commerce and the like may be provided and/or conducted online over the internet. By way of example, these online services include financial services, stock market transactions, mobile banking, electronic payments, and the like. Moreover, financial institutions, banks and/or service providers offer a broad range of mobile banking which may include virtual and/or branchless entities, wherein users may conduct various online transactions such as making payments and transferring money to other users and entities (e.g., merchants). Generally, a user is required to establish one or more user accounts with one or more service providers and/or financial institutions as well as provide transaction information such as user account information, transaction type, transaction target (e.g., a recipient), transaction target account information and the like before conducting a transaction.

However, sensitive transactions, such as mobile banking, require accurate transaction information, which the user/initiator of the transaction would need to provide wherein the accuracy may depend on the user's familiarity level with computer devices (e.g., mobile phones, PDAs, etc.) and the ability to interface with a user device for manually and/or semi-manually inputting the required transaction information (e.g., phone number, account number, address, etc.) Furthermore, the required transaction information may comprise a long series of alphanumeric characters, which may be time consuming and prone to errors when entered into an application on the user device. Moreover, a user attempting to conduct an online financial transaction may not have/know all the required information of the target (e.g., account number, associated financial institution, full name, address, etc.) at the moment and would have to search and/or ask for the information.

To address these problems, a system 100 of FIG. 1 introduces the capability of recognition data (e.g., generated from one or more biometric or object samples such as images for facial/object recognition, fingerprint samples for fingerprint recognition, etc.) to determine parameters for conducting one or more transactions (e.g., financial transactions or other service transactions). In other words, instead of manually input or specifying transaction parameters (e.g., typing the name of a recipient), the system 100 enables the user to capture a biometric sample (e.g., an image of the person) via the user's device. The sample can then be processed to recognize or determine a parameter of the transaction. In one example, to send money a target recipient via a money service, the user can take a picture of the person to whom the money should be sent. The system 100 processes the image to identify (e.g., via facial recognition) the person in the image and then automatically specifies that person as the intended recipient. In some embodiments, the system 100 enables any transaction parameter (e.g., transaction amount, currency, etc.) to be specified through recognition data. For example, the user can capture an image of particular bank from which to send money, a picture of a calendar that indicates a specific date to send the money, a picture of a currency type for sending the money, etc.

Although various embodiments discuss recognition data generated from image date, it is contemplated that any biometric samples or data can be processed to generate the recognition (e.g., the person, object, etc. indicated in the biometric samples or data). Generally, biometric data comprise various distinctive, measurable identifiers; such as facial characteristics, finger print, iris san, palm print, DNA, voice, and the like; which are unique to individuals and therefore, are more reliable in providing identification information associated with an individual in a group of individuals. For example, facial recognition and other recognition technologies make it much easier for users to search in a local and/or a remote phonebook or a database for information (e.g., account number, phone number, name, etc.) associated with an individual. Users may no longer need specific information about other individuals to submit a financial transaction request to one or more service providers and/or financial institutions.

As discussed above, in one use scenario, a user wishes to send some money to one or more persons (transaction targets) wherein, (1) the user launches a financial transaction client on a device (e.g., a mobile device); (2) the user utilizes a device (e.g., a camera on the mobile device) to capture one or more images of the one or more persons and identify/select (e.g., tag, highlight, etc.) one or more persons in one or more images to whom the user wishes to send money; (3) the financial transaction client analyzes the images utilizing one or more face-recognition algorithms; (4) the financial transaction client compares the images and/or images' data with one or more images and/or images' data associated with one or more contacts stored in a phonebook on the device; (5) if one or more matches are found, then contact details; for example, mobile phone number, account number, bank name, and the like; of the matched contacts are retrieved from the phonebook and substantially automatically are input into the financial transaction client; (6) the user inputs additional transaction information such as one or more currencies, amounts, messages, dates for executing the one or more transactions, and the like; (7) the user and/or the financial transaction client cause one or more requests for one or more transactions, including all relevant collected information, to be sent to one or more service providers and/or one or more financial institutions for processing.

In one embodiment, if an image of a transaction target (target image) doesn't match to any of the phonebook contact images, then the target image and/or face recognition data may be sent to one or more service providers and/or financial institutions for further searching. Next, if a match is identified, then one or more information items (e.g., phone number, name, account number, financial institution name, etc.) associated with the transaction target are retrieved and substantially automatically input into the financial transaction client. Further, the user may review, approve and submit a request for the financial transaction to one or more service providers and/or financial institutions for processing.

In various embodiments, one or more other biometric characteristics; such as a finger print, an iris scan, a palm print, a voice sample, and the like; associated with one or more transaction targets may be utilized for identifying the one or more transaction targets and obtaining the one or more transaction targets' information for use in one or more financial transaction processes.

In one embodiment, the financial transaction client (FTC) determines a request from a user to designate at least one parameter of one or more transactions, wherein the request includes, at least in part, one or more biometric samples associated with the at least one parameter, and wherein the at least one parameter includes, at least in part, the user as an initiator of the one or more transactions, at least one other user that is at least one target of the one or more transactions, or a combination thereof. Further, at least a portion of the one or more transactions comprises one or more financial transactions. For example, a user wishes to conduct a financial transaction and launches the FTC and/or one or more applications which may cause the FTC to be launched (e.g., locally or remotely). Further, the user may input various parameters for the financial transaction such as an amount, a currency type, a transaction date, and one or more biometric samples, wherein the biometric samples may be associated with the user and/or with one or more other users/individuals. For example, the user may input a picture of the user and of one or more other users. As previously noted, the biometric samples may comprise one or more characteristics such as facial characteristics, finger print, iris scan, palm print, DNA, voice, and the like. Additionally, the biometric samples may be retrieved from a local and/or a remote storage device or may be captured at the time of the financial transaction. For example, the user may retrieve a picture of the user and a picture of another user stored on the user's device.

In various embodiments, the FTC processes and/or facilitates a processing of the one or more biometric samples to cause, at least in part, a recognition of the at least one parameter. In various embodiments the recognition is performed, at least in part, by utilizing one or more biometric recognition technologies including, at least in part, a facial recognition technology, a voice recognition technology, a finger print recognition technology, or a combination thereof. In one scenario, the user device processes the one or more biometric samples utilizing one or more algorithms and/or one or more applications available (e.g., locally or remotely) to the user device and compares the results to one or more stored biometric samples to determine one or more information items associated with the individuals determined from the biometric analysis. For example, the one or more biometric samples may include an image of the user and an image of another user (e.g., user's friend) wherein facial recognition analysis results are compared to stored images on the user device (e.g., in a phonebook) wherein the results match to stored images of the user and of the another user. Furthermore, once one or more matches are identified, one or more available information items associated with the user and/or with the another user are retrieved and are input into the FTC as one or more transaction parameters which may comprise a phone number, a bank account number, a full name, a bank name, and the like.

In one embodiment, the FTC causes, at least in part, an initiation of the one or more transactions based, at least in part, on the recognition. For example, the FTC processes, receives and/or recognizes the one or more transaction parameters and initiates the one or more transactions.

In various embodiments, the FTC causes, at least in part, a rendering of a user interface (UI) for initiating at least one capture of at least one of the one or more biometric samples for identifying the user as the initiator. For example, the FTC presents one or more options for the user to capture an image of the user via a camera on the user device, select and identify the user as the initiator of the transaction. In another embodiment, the UI presents one or more options for the user to at least capture at least another one of the one or more biometric samples (e.g., image, finger print, iris scan, etc.) for identifying the at least one other user as the at least one target. For example, the user may utilize the user device to take a picture of the another user, capture a finger print of the another user, capture an iris scan of the another user, and/or the like.

In various embodiments, the at least one other user is a plurality of other users, and wherein the at least another capture includes the plurality of other users as a group; as one or more individuals, one or more subgroups, or a combination thereof in separately captured ones of the one or more biometric samples; or as a combination thereof. For example, a user may wish to execute one or more financial transactions (e.g., transfer money) targeting multiple other users (e.g., multiple friends, merchants, family members, etc.) in one or more images. In one embodiment, the user may input one or more images and select/identify one or more other users, groups, subgroups and the like included in the one or more images, wherein the selection/identification may be accomplished by tagging, highlighting, and the like.

In various embodiments, the FTC causes, at least in part, a transmission of an authorization request to complete the one or more transactions to the user and/or to the at least one other user for executing the one or more transactions, wherein the execution of the one or more transactions is based, at least in part, on one or more responses to the authorization request. In one embodiment, the FTC receives one or more transaction parameters and causes an authorization request to be transmitted/presented (e.g., via the UI on the user device) to the user (e.g., initiator of the transaction) so that the user may confirm the one or more parameters in the transactions; for example, the one or more other users, transaction amount, currency type, transaction date, and the like; and proceed to completion and execution of the transaction. In another embodiment, the authorization request is transmitted/presented to the user and to the at least one other user for confirmation. In one embodiment, the at least one other user can review and determine a decision as to whether to authorize execution of the transaction and/or respond to the user's request directly and/or via the service provider. In another embodiment, if the other user denies the request, the service provider and/or the other user may send a denial response to the user. Further, the denial response may include one or more information, links, and actions for the user determined by the service provider and/or by the other user.

In one embodiment, the FTC determines to include one or more messages, one or more links, supplemental information, or a combination thereof associated with the one or more responses. In one example, the user and/or the one or more other users may wish to include a message with the one or more responses to indicate one or more information items and/or messages associated with a financial transaction for the user, for the other user and/or for the service provider.

In one embodiment, the FTC processes and/or facilitates a processing of the recognition to determine one or more dates, one or amounts, one or more currency types, or a combination thereof associated with the one or more transactions. For example, a user may utilize the user device (e.g., a camera) to capture an image of a calendar (e.g., for a date indication), one or more images of one or more coins and/or bank notes (e.g., for an amount), one or more images of one or more currency notes and/or symbols (e.g., for one or more currency types) wherein the images may be utilized to determine the one or more parameters associated with the one or more transactions.

In one embodiment, the FTC determines an input from the user for selecting at least a portion of the one or more biometric samples that represent the at least one parameter, wherein the recognition is performed based, at least in part, on the selected at least a portion of the one or more biometric samples. For example, the user may input into the FTC one or more images comprising multiple images of multiple other users wherein the user may tag, highlight, mark, and the like to select/identify at least one other user as a target for one or more transactions.

In one example, one or more user equipment (UEs) 101a-101n may be utilized to execute applications 103a-103n (e.g., a social networking application, a web browser, a media application, user interface, GPS, a mapping application, a web client, etc.) to access one or more available online services over a communication network 109. These online services, for instance, may be accessed via one or more services platform 117 wherein one or more service providers; for example, financial services 119a (e.g., Nokia Money™), social networking services 119b, online shopping, media upload, media download, and the like; can provide one or more services. Further, the financial services 119a may comprise one or more financial institutions (e.g., banks, trading platforms, brokers, agents, etc.) and/or may be providing one or more services to one or more financial institutions wherein the financial services may be provided to one or more individuals (e.g., users) and/or to one or more entities (e.g., companies, institutions, banks, merchants, etc.) It is noted that although various embodiments are described with respect to utilizing biometric/object recognition platform 111 in accessing services via financial services 119a, it is contemplated that the approach described herein may be applicable to any other platform and/or service in which biometric and object recognition information may be utilized in accessing and/or providing one or more services (e.g., mobile banking, mobile payments, mobile wallet, web forums, search engines, etc.)

As shown in FIG. 1, a biometric/object recognition platform 111 may be utilized by the financial services 119a and/or a financial transaction client (FTC) 105 to analyze one or more images of an object and/or one or more biometric characteristics of one or more individuals for recognizing the one or more objects and/or the one or more individuals and further, to search through one or more media and information database in order to obtain one or more information items associated with the one or more objects and/or the one or more individuals. The biometric/object recognition platform 111 may have access to biometric/object database 113 and to information database 115 wherein the biometric/object recognition platform 111 may receive and analyze one or more media items (e.g., digital files including pictures, audio, video, etc.) comprising one or more biometric characteristics (e.g., facial image, finger print, iris scan, voice sample, etc.) associated with one or more individuals (e.g., users) and/or one or more images of one or more objects (e.g., a picture of a coin, bank note, calendar, merchant sign, etc.) Further, the biometric/object recognition platform 111 may compare the results of the one or more biometric and/or object recognition analysis with one or more items in the biometric/object database 113 and if a match is determined, then the one or more media items may be associated with one or more information items in the information database 115. For example, one or more information items such as a phone number, an account number, a bank name, email address, full name, object type, a number associated with the object, a currency type, a currency amount, and the like from the information database 115 may be associated with the one or more media items. In various embodiments, the contents in the biometric/object database 113 and/or in the information database 115 may be provided by one or more state agencies (e.g., state social services), one or more service providers (e.g., banks, social networking, etc.), one or more users (e.g., individuals, merchants, employers, etc.) and/or the like. Further, the biometric/object database 113 and/or information database 115 may be restricted and only accessible to one or more authorized UEs 101, one or more authorized financial services 119a, one or more authorized services platform 117, one or more authorized state agencies, and the like. Furthermore, the biometric/object database 113 and/or the information database 115 may be associated with one or more privacy and/or security policies. In certain embodiments, the biometric/object recognition platform 111 may be a part of the service platform 117, the financial services 119a, the social networking platform 119b, or any other platform for providing such recognition services. It is also contemplated that the biometric/object recognition platform 111, information database 115, biometric/object database 113, other sources of related data (e.g., other platforms), and their respective components may be located in a centralized component (e.g., a common server or platform) or distributed in among multiple components, servers, and/or locations in, for instance, a distributed or decentralized manner.

In the approach described herein, a user can initiate a financial transaction including a search for information associated with a target (e.g., another user) of the financial transaction. The user may utilize the social networking application 119b, a web browser, a camera, or another application and/or device of the UE 101 to upload one or more media items (e.g., a digital image, a video, an audio sample, a finger print, etc.) to a service provider (e.g., the social networking services 119b, the biometric/object recognition platform 111, the financial services 119a, a search engine, etc.), tag/identify a target (e.g., a person and/or an item in the image) and initiate a search for information associated with the target. According to certain embodiments, tags are information associated with media items that can be utilized to identify specific content in a media item. Examples of tags include identifiable information about the user, other users, an object associated with a user, information about an environment, or a combination thereof. Identifiable information about the user (or other users) may include one or more facial images, and/or a three-dimensional depiction of a face, person, etc. that may be utilized to determine a facial model (e.g., a three-dimensional model) of the user to compare with image and/or media items to search for the face. In a media item that includes a voice, such as a video or audio recording, a user's (or other users') voice can be utilized to generate a voice model. As previously noted, these identifiable information may be stored in the information database 115, biometric/object database 113 and/or other database available in the communication network 109 which may be decentralized and in certain embodiments one or more portions of the information may be available on the UE 101.

In various embodiments, a first user may utilize a UE 101 to capture an image of at least another user, or the user may retrieve an image of the another user from a storage device on the UE 101, or the image of the another user may be presented to the first user on a social networking site, or the first user can point the user device at the another user and tag the image (e.g., face) of the another user, or a combination thereof. The tagging may be done by highlighting, marking, or by providing one or more reference parameters in the image (e.g., a frame number, a picture number, etc.) In another embodiment, the first user sends a request to a service provider for information associated with at least the another user, or sends a request (e.g., a social networking request) intended to be forwarded to at least the another user. The first user can optionally add a message, a link or any other info to help the another user recognize the first user and ascertain what the request is for.

In one embodiment, a facial model for, at least, the another user is computed (e.g., by a facial recognition algorithm) at a user device and/or by a service provider wherein, at least, the another user is identified (e.g., on the cloud, on the service provider's database, etc.). The service provider (e.g., the biometric/object recognition platform 111, the social networking platform 119b, the service platform 117, a search engine, etc.) may utilize conventional algorithms (e.g., image or voice processing algorithms) and methods to identify the target (e.g., the another user). For example, in the case that the target is a face, a face recognition system may be utilized to automatically identify a person from an image or video frame. As such, selected facial features from the media item can be compared with facial features present in provided facial features images to determine a facial model. Exemplary facial recognition systems may utilize algorithms to extract landmarks or features from a face (e.g., relative size or position of eyes, nose, cheekbones, jaw, etc.) provided to generate a facial model. Particular algorithms that may be utilized include Principal Component Analysis, Hidden Markov model, Linear Discriminate Analysis, Elastic Bunch Matching fisherface, etc. Further, such algorithms and models may be utilized to recognize features such as tattoos and other identifying marks. Examples of other feature recognition include the determination of a person's voice using voice recognition technology, finger print analysis, iris scan analysis, and the like.

Alternatively, already tagged models are used and the identity of the another person is computed at a service provider's server or on the cloud. Further, the first user can share information about the another user's location history with the biometric/object recognition platform 111 so that search to identify and information associated with the another user can then narrow down to the content that is captured in the locations where the second user was at a given time (e.g., based on location history). In an example, if the first user is present in the image, then the first user may also automatically or manually tagged/marked as the initiator of the transaction. Further, the search can be made more efficient by collecting contextual information about the first and/or the another user to narrow or reduce the amount of media content to be scanned.

By way of example, the system 100 comprises the UE 101 having connectivity to, the services platform 117, and biometric recognition platform 111 via the communication network 109. In certain embodiments, the UE 101 may utilize GPS satellites 123 to determine location of the UE 101 for receiving location based services and/or to provide to one or more service providers for their utilization, for example, in determining an appropriate/authorized access to one or more user services and/or accounts. By way of example, the communication network 109 of system 100 includes one or more networks such as a data network, a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

By way of example, the UE 101, the services platform 117, and the biometric recognition platform 111 communicate with each other and other components of the communication network 109 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
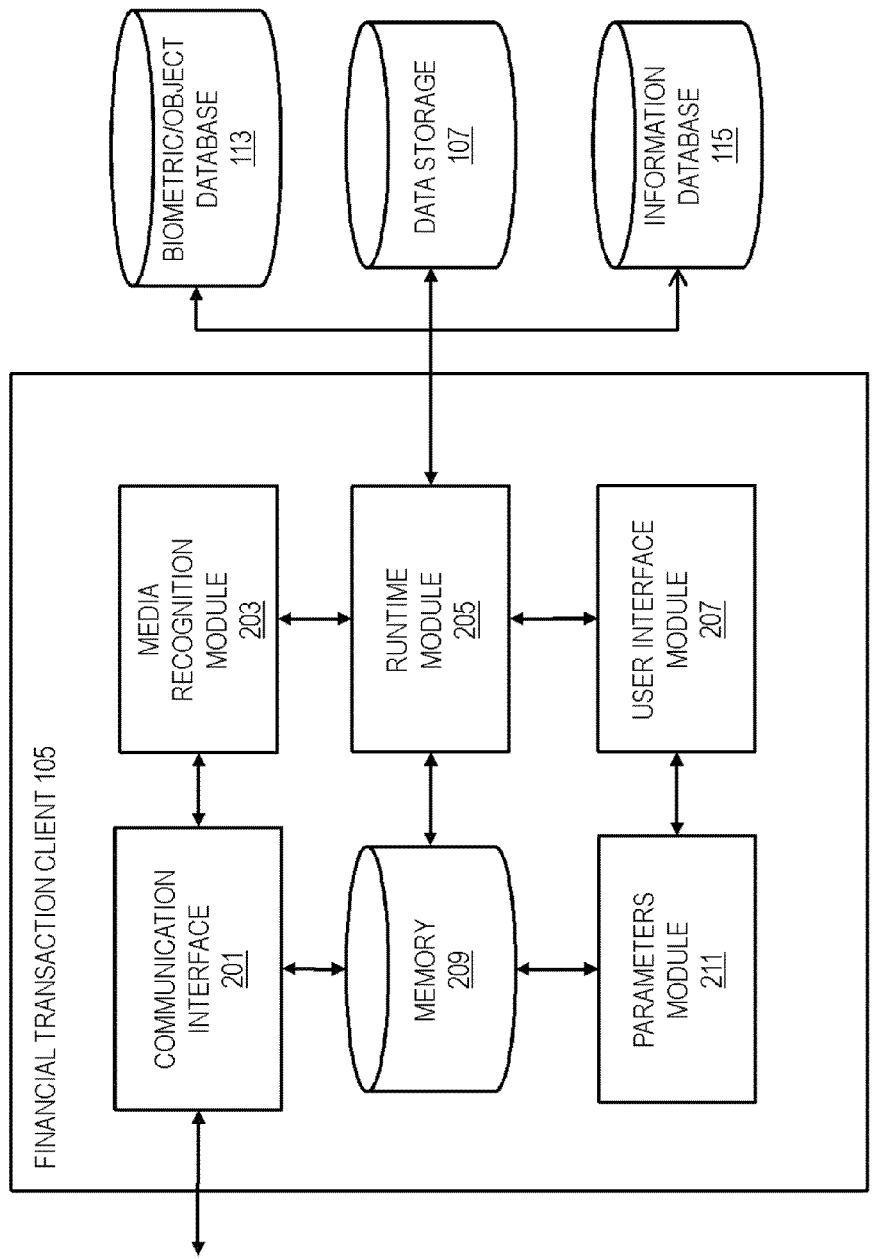
FIG. 2 is a diagram of the components of a financial transaction client, according to one embodiment.

FIG. 2 is a diagram of the components of a financial transaction client 105, according to one embodiment. By way of example, the financial transaction client 105 includes one or more components for capturing one or more parameters for initiating one or more financial transactions. It is contemplated that the functions of these components may be combined in one or more components or performed by other components of equivalent functionality. In this embodiment, the financial transaction client 105 includes a communication interface 201, a media recognition module 203, a runtime module 205 that can execute processes and applications, a user interface module 207 that can present one or more interface options to the user of UE 101 (e.g., for inputting one or more parameters), a memory 209, and a parameters module 211 for capturing one or more parameters for one or more financial transactions. Moreover, it is noted that the financial transaction client 105 may be a partial or a whole component at one or more service providers.

The communication interface 201 can be used to communicate with the UE 101. The service platform 117, the financial transactions 119a, the biometric/object recognition platform 111 may receive information from the UE 101 via the communication interface 201 via methods such as internet protocol, MMS, SMS, GPRS, or any other available communication method. The UE 101 can send financial transaction parameters and request directly to the financial services 119a, via the social networking services 119b, or via the services platform 117. Further, the runtime module 205 may utilize the communication interface 201 to receive information associated with another user registered with the financial services 119a. The runtime module 205 can utilize the communication interface 201 to retrieve media and/or information associated with the another user (e.g., a set of images, information associated with the another user's face) and/or one or more objects. The information may be stored in the information database 115 and the media may be stored in the biometric/object database 113. As noted previously, access to the biometric and associated media and information items may be restricted to authorized users and/or service providers (e.g., financial services 119a) The restriction rules may also be stored in the information database 115, biometric/object database 113, in the memory 209, or other storage mediums available on the communication network 109.

Further, the runtime module 205 may execute the media recognition module 203 to analyze one or more media items (e.g., images, audio samples, etc.) for recognition of one or more users, one or more objects, and the like. Furthermore, the media recognition module 203 may compare the results of the one or more media analysis to other media items locally and/or remotely available to the UE 101 such one or more information items may be retrieved from one or more local and/or remote databases. In one embodiment, the media recognition module 203 may request that the one or more media items are submitted to one or more service providers (e.g., the biometric/object recognition platform 111) for further analysis. For example, the media recognition module 203 may not have access to required resources for analyzing the one or more media items.

In various embodiments, the parameters module 211 may interface with the user interface module 207, for example; via a touch display, a virtual/physical keypad, audio input, and the like; for presenting one or more options for the user to input one or more parameters for one or more financial transactions. For example, the user may input one or more media items, one or more dates, one or more amounts, one or more currency types, one or more other user information items, and the like. Further, the parameters module 211 may present one or more options for the user to input the one or more parameters, for example, by handwriting, by attaching a media, by indicating one or more links associated with one or more information items, and the like.

Figure 3:
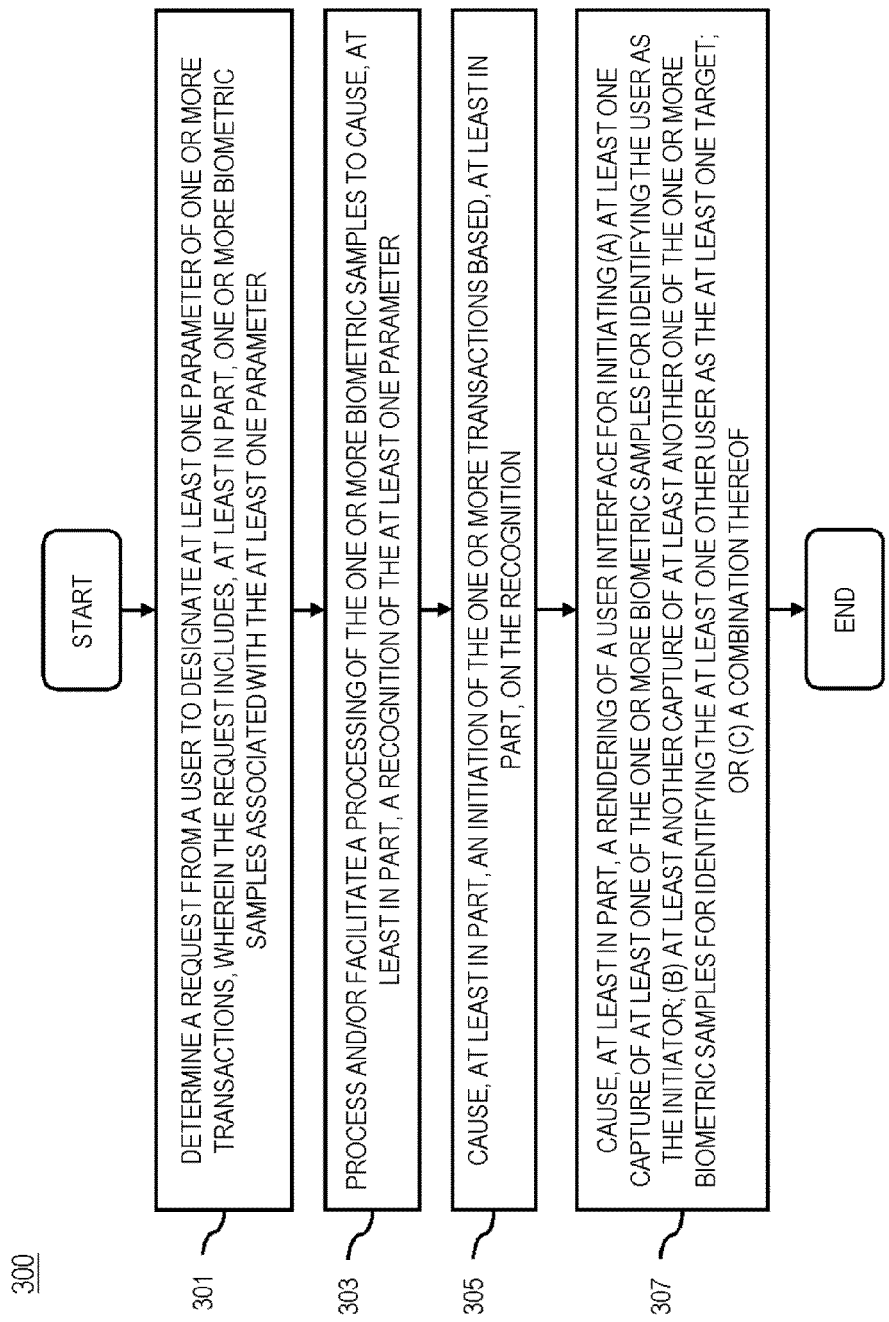
FIG. 3 is a flowchart of a process for a transaction request while utilizing one or more biometric sample or object recognition data as one or more transaction parameters, according to one embodiment.

FIG. 3 is a flowchart of a process for a transaction request while utilizing one or more biometric sample or object recognition data as one or more transaction parameters, according to one embodiment. In various embodiments, the runtime module 205, the biometric/object recognition platform 111 and/or the financial services 119a perform all or parts of the process 300 and are implemented in, for instance, a chip set including a processor and a memory as shown FIG. 9. In certain embodiments, the financial services 119a may perform some or all of the steps of the process 300 and communicate with the UE 101 using a client server interface. For example, the UE 101 may activate financial transaction client 105 for requesting and executing one or more transactions at the financial transaction services 119a. Moreover, the applications 103 may execute upon the runtime module 205.

In step 301, the runtime module 205 determines a request from a user to designate at least one parameter of one or more transactions, wherein the request includes, at least in part, one or more biometric samples associated with the at least one parameter, wherein the at least one parameter includes, at least in part, the user as an initiator of the one or more transactions, at least one other user that is at least one target of the one or more transactions, or a combination thereof. Further, at least a portion of the one or more transactions comprises one or more financial transactions. For example, a user wishes to conduct a financial transaction and launches the FTC and/or one or more applications which may cause the FTC to be launched (e.g., locally or remotely). Further, the user may input various parameters for the financial transaction such as an amount, a currency type, a transaction date, and one or more biometric samples, wherein the biometric samples may be associated with the user and/or with one or more other users/individuals. For example, the user may input a picture of the user and of one or more other users. As previously noted, the biometric samples may comprise one or more characteristics such as facial characteristics, finger print, iris scan, palm print, DNA, voice, and the like. Additionally, the biometric samples may be retrieved from a local and/or a remote storage device or may be captured at the time of the financial transaction. For example, the user may retrieve a picture of the user and a picture of another user stored on the user's device.

In step 303, the runtime module 205 and/or biometric/object recognition platform 111 process and/or facilitate a processing of the one or more biometric samples to cause, at least in part, a recognition of the at least one parameter. In various embodiments, the recognition is performed, at least in part, by utilizing one or more biometric recognition technologies including, at least in part, a facial recognition technology, a voice recognition technology, a finger print recognition technology, or a combination thereof. In one scenario, the user device processes the one or more biometric samples utilizing one or more algorithms and/or one or more applications available (e.g., locally or remotely) to the user device and compares the results to one or more stored biometric samples to determine one or more information items associated with the individuals determined from the biometric analysis. For example, the one or more biometric samples may include an image of the user and an image of another user (e.g., user's friend) wherein facial recognition analysis results are compared to stored images on the user device (e.g., in a phonebook) wherein the results match to stored images of the user and of the another user. Furthermore, once one or more matches are identified, one or more available information items associated with the user and/or with the another user are retrieved and are input into the FTC as one or more transaction parameters which may comprise a phone number, a bank account number, a full name, a bank name, and the like. It is contemplated that an analogous process can be used to identify any other type of media feature (e.g., voice using voice recognition, objects using object recognition, etc.). Moreover, when multiple target types (e.g., face and object) are selected for identification, multiple recognition models can be created to facilitate the identification of the targets in the media items.

In step 305, the runtime module 205 causes, at least in part, an initiation of the one or more transactions based, at least in part, on the recognition. For example, the FTC 105 processes, receives and/or recognizes the one or more transaction parameters and initiates the one or more transactions.

In step 307, the runtime module 205 causes, at least in part, a rendering of a user interface (UI) for initiating at least one capture of at least one of the one or more biometric samples for identifying the user as the initiator. For example, the FTC presents one or more options for the user to capture an image of the user via a camera on the user device, select and identify the user as the initiator of the transaction. In another embodiment, the UI presents one or more options for the user to at least capture at least another one of the one or more biometric samples (e.g., image, finger print, iris scan, etc.) for identifying the at least one other user as the at least one target. For example, the user may utilize the user device to take a picture of the another user, capture a finger print of the another user, capture an iris scan of the another user, and/or the like.

In various embodiments, the at least one other user is a plurality of other users, and wherein the at least another capture includes the plurality of other users as a group; as one or more individuals, one or more subgroups, or a combination thereof in separately captured ones of the one or more biometric samples; or as a combination thereof. For example, a user may wish to execute one or more financial transactions (e.g., transfer money) targeting multiple other users (e.g., multiple friends, merchants, family members, etc.) in one or more images. In one embodiment, the user may input one or more images and select/identify one or more other users, groups, subgroups and the like included in the one or more images, wherein the selection/identification may be accomplished by tagging, highlighting, and the like.

Figure 4:
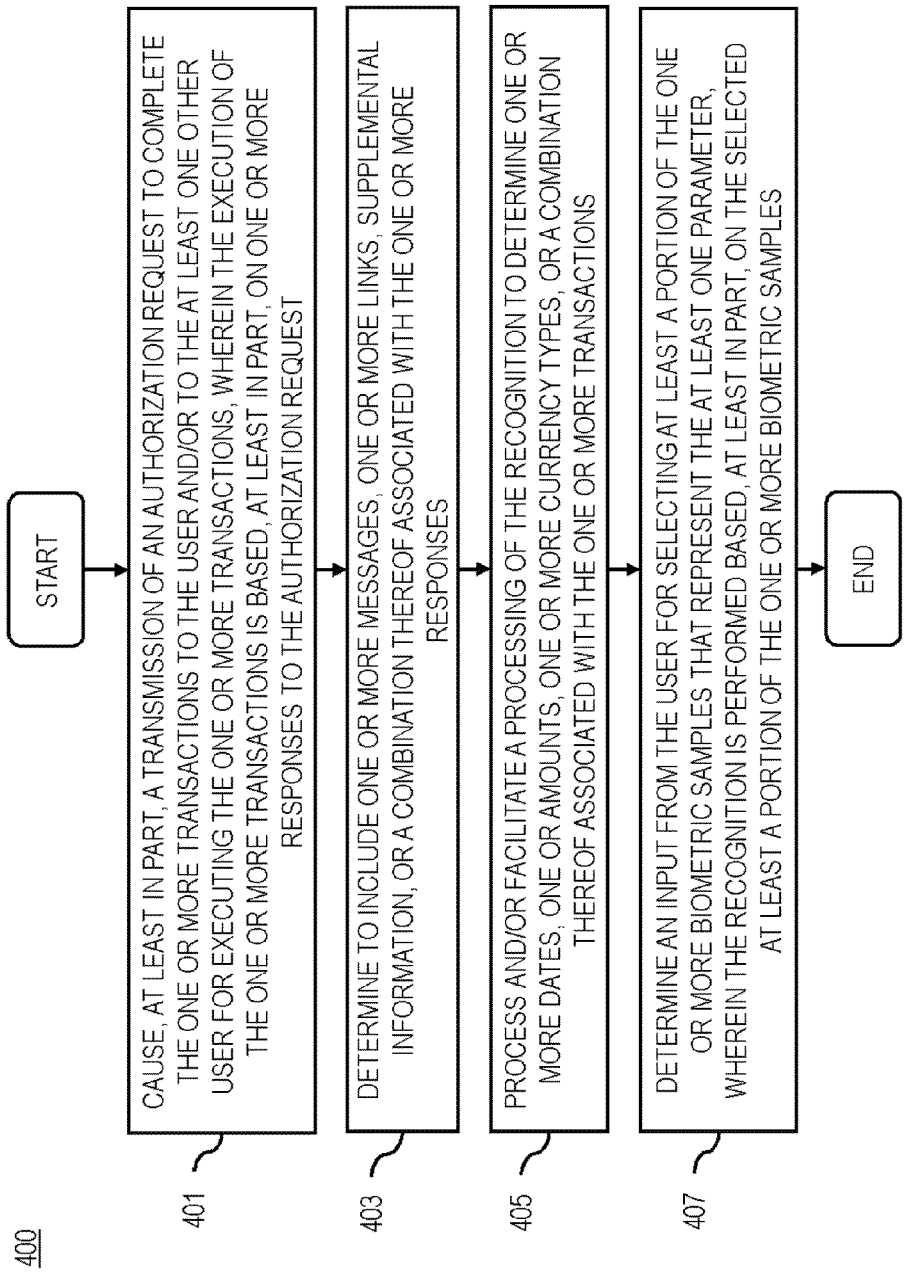
FIG. 4 is a flowchart of a process for transmitting an authorization request to complete one or more transactions, according to one embodiment.

FIG. 4 is a flowchart of a process for transmitting an authorization request to complete the one or more transactions, according to one embodiment. In various embodiments, the runtime module 205, the biometric/object recognition platform 111 and/or the financial services 119a perform all or parts of the process 400 and are implemented in, for instance, a chip set including a processor and a memory as shown FIG. 9. In certain embodiments, the financial services 119a may perform some or all of the steps of the process 400 and communicate with the UE 101 using a client server interface. For example, the UE 101 may activate financial transaction client 105 for requesting and executing one or more transactions at the financial transaction services 119a. Moreover, the applications 103 may execute upon the runtime module 205.

In step 401, the runtime module 205 and/or the financial services 119a cause, at least in part, a transmission of an authorization request to complete the one or more transactions to the user and/or to the at least one other user for executing the one or more transactions, wherein the execution of the one or more transactions is based, at least in part, on one or more responses to the authorization request. In one embodiment, the FTC receives one or more transaction parameters and causes an authorization request to be transmitted/presented (e.g., via the UI on the user device) to the user (e.g., initiator of the transaction) so that the user may confirm the one or more parameters in the transactions; for example, the one or more other users, transaction amount, currency type, transaction date, and the like; and proceed to completion and execution of the transaction. In another embodiment, the authorization request is transmitted/presented to the user and to the at least one other user for confirmation. In one embodiment, the at least one other user can review and determine a decision as to whether to authorize execution of the transaction and/or respond to the user's request directly and/or via the service provider. In another embodiment, if the other user denies the request, the service provider and/or the other user may send a denial response to the user. Further, the denial response may include one or more information, links, and actions for the user determined by the service provider and/or by the other user.

In step 403, the runtime module 205 and/or the financial services 119a, determine to include one or more messages, one or more links, supplemental information, or a combination thereof associated with the one or more responses. In one example, the user and/or the one or more other users may wish to include a message with the one or more responses to indicate one or more information items and/or messages associated with a financial transaction for the user, for the other user and/or for the service provider.

In step 405, the runtime module 205 and/or the biometric/object recognition platform 111 process and/or facilitate a processing of the recognition to determine one or more dates, one or amounts, one or more currency types, or a combination thereof associated with the one or more transactions. For example, a user may utilize the user device (e.g., a camera) to capture an image of a calendar (e.g., for a date indication), one or more images of one or more coins and/or bank notes (e.g., for an amount), one or more images of one or more currency notes and/or symbols (e.g., for one or more currency types) wherein the images may be utilized to determine the one or more parameters associated with the one or more transactions.

In step 407, the runtime module 205 determines an input from the user for selecting at least a portion of the one or more biometric samples that represent the at least one parameter, wherein the recognition is performed based, at least in part, on the selected at least a portion of the one or more biometric samples. For example, the user may input into the FTC one or more images comprising multiple images of multiple other users wherein the user may tag, highlight, mark, and the like to select/identify at least one other user as a target for one or more transactions.

Figure 5:
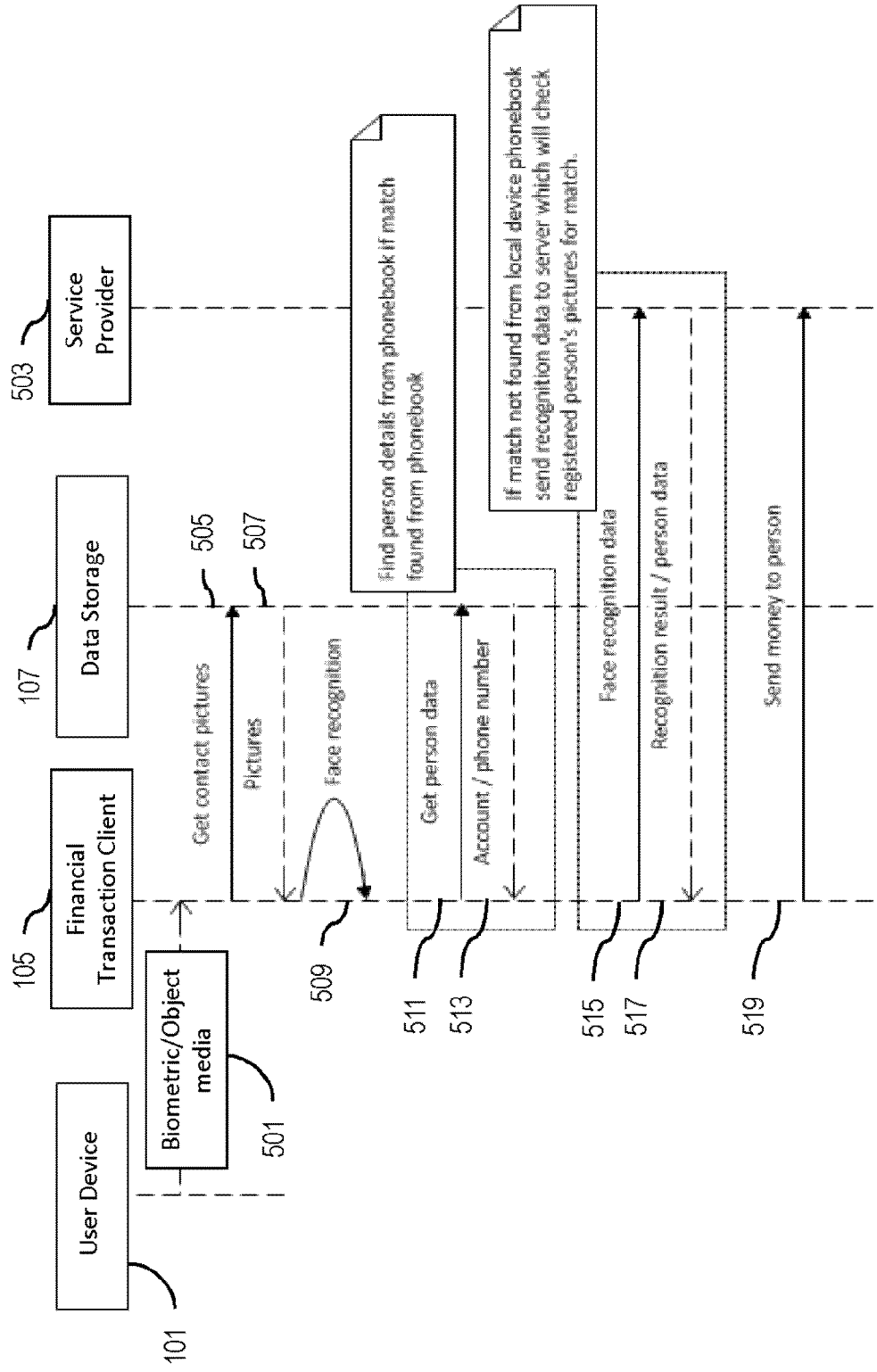
FIG. 5 is a time sequence diagram illustrating the communication between a device and one or more service providers, according to one embodiment.

FIG. 5 is a time sequence diagram illustrating the communication between the UE 101 and one or more service providers, according to various embodiments. In one use scenario, at 501 a user utilizes the UE 101 to capture one or more biometric samples (e.g., a facial image, a finger print, an iris scan, etc.) from one or more other users (e.g., individuals, groups, etc.) In this example use, the biometric/object media is a facial picture of another person which is input as a parameter (e.g., target of transaction) into the financial transaction client (FTC) 105. In one embodiment, at 505 the FTC 105 directly sends a "get contact pictures" request for one or more pictures and/or analyzed image models of the pictures to the data storage 107. Furthermore, at 507 the one or more pictures and/or analyzed image models of the pictures are received at the FTC 105, and at 509 the FTC 105 and/or one or more applications 103 utilize one or more facial recognition algorithms to analyze and compare the captured picture with one or more pictures stored at data storage 107 (e.g., a local/remote phonebook) available to the UE 101. Moreover, at 511 if the user confirms that the captured picture at 501 matches to a picture of a contact in the data storage 107 (e.g., retrieved at 509), then the FTC 105 requests one or more information items from the data storage 107 associated with the contact, (e.g., determined at 507 and 509). At 513, the information items which may comprise a phone number, a full name, a bank account number, a bank name, and the like are retrieved from the data storage 107 and input into the FTC 105. However, if at 509 a match at a local and/or remote data storage 107 was not found, then at 515 the facial picture of 501 and/or facial recognition data is send to one or more service providers for searching. In various embodiments, UE 101 may directly request the analysis from the biometric/object recognition platform 111, or send the request to the services platform 117, to the financial services 119a and/or one or more other service providers capable of providing the analysis, search and information associated with the person in the picture. If a service provider determines a match to the picture captured at 501, then at 517 one or more information items associated with the person in the picture is presented to the user. At 519, the user of UE 101 confirms/completes one or more parameters of the transaction (e.g., target of the transaction, amount, currency, etc.) and requests for the service provider 503 (e.g., financial services 119a) to execute the transaction (e.g., send money to the person in the picture) is executed. Furthermore, in various embodiments, one or more service providers (e.g., financial services 119a) may send one or more authorization requests to one or more users and/or to one or more other users (e.g., target of the transaction) during and/or before the transaction is executed for one or more authorizations.

FIGS. 6A-6F show renderings of user interfaces on a UE 101 utilized in conducting various financial transactions, according to various embodiments.

Figure 6B:
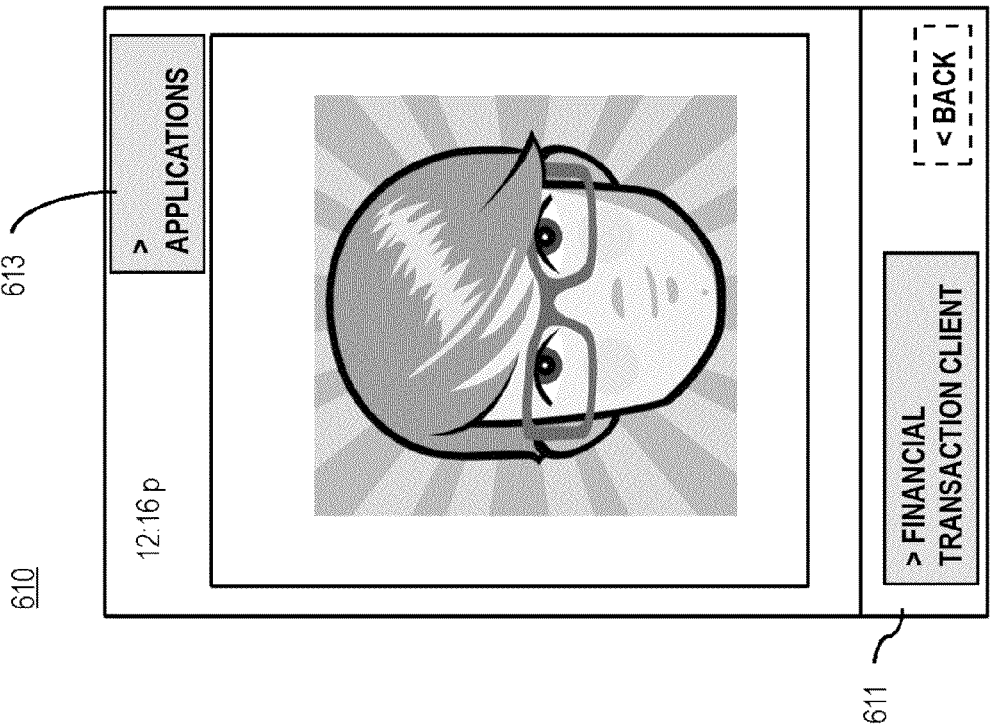
FIGS. 6A-6H show renderings of user interfaces on utilized in the processes of FIGS. 3 and 4, according to various embodiments.
Figure 6A:
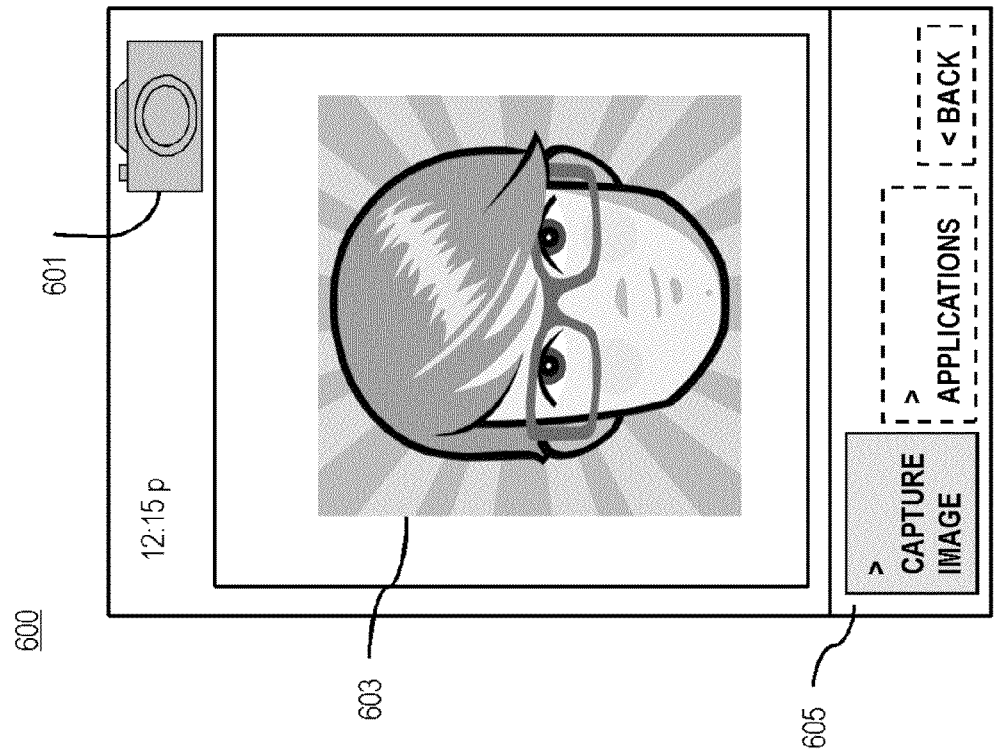
Figure 6D:
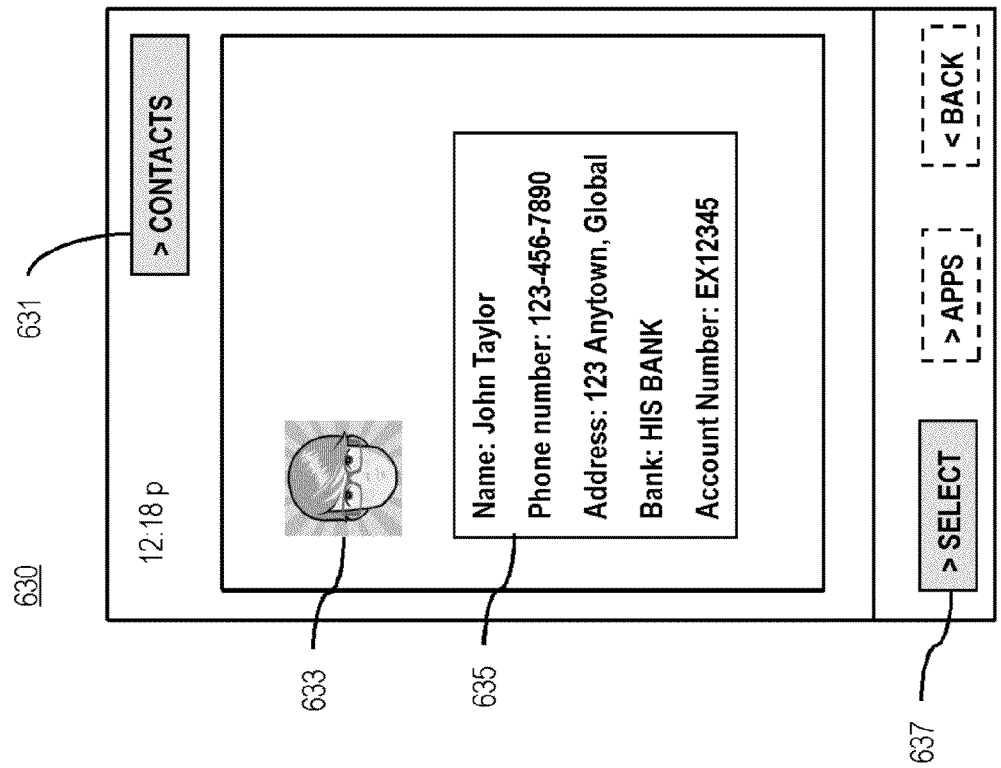
Figure 6C:
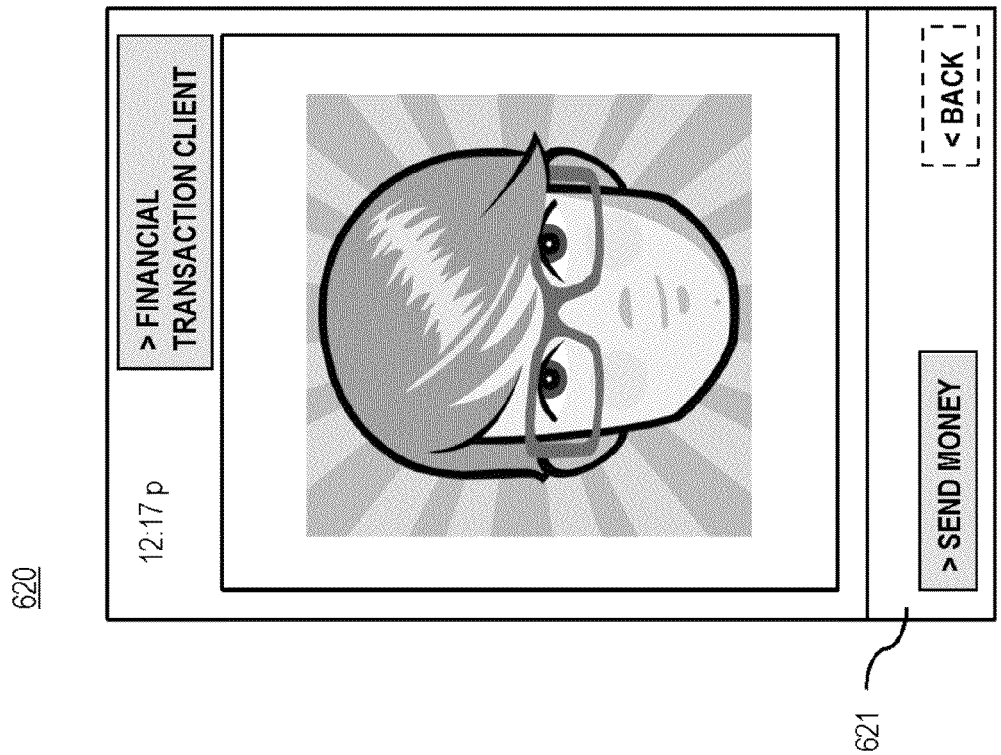
Figure 6E:
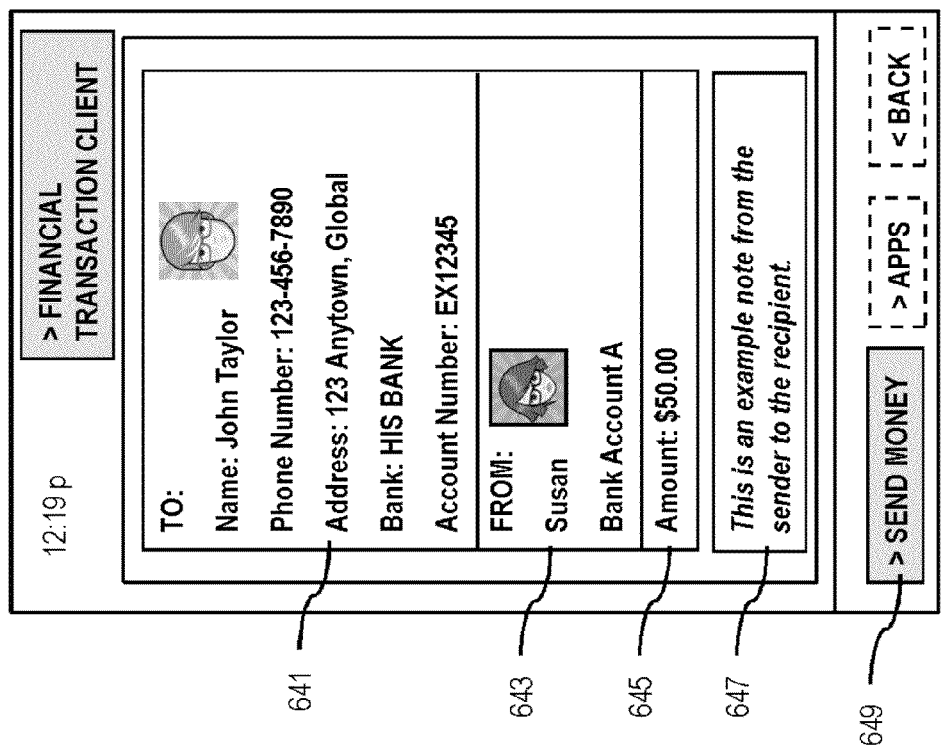

FIG. 6A depicts user interface (UI) 600 wherein a user utilizes a camera mode 601 to capture an image 603 of another user (e.g., another person) via a user option command at 605. In one embodiment, the user wishes to conduct a financial transaction (e.g., transfer some money) with the person in the captured image, for example, the transaction target. Further, FIG. 6B shows UI 610 where the user selects a "FINANCIAL TRANSACTION CLIENT" (FTC) 611 from "APPLICATIONS" 613 menu option. Furthermore, FIG. 6C shows user interface 620 wherein the user selects an option 621 "SEND MONEY", whereby the FTC and/or one or more applications 103 utilize one or more facial recognition algorithms to conduct one or more searches in the UE 101 data storage 107 (e.g., a phonebook) and/or in one or more remote data storages (e.g., date storage in cloud computing) available to the UE 101 to determine if a match to the captured image can be found. FIG. 6D shows UI 630 wherein a match is found in the UE 101 "CONTACTS" and one or more associated image 633 and information items 635 are retrieved, wherein the user may review, confirm and "SELECT" the match via menu option 637. In FIG. 6E, UI 640 shows an example FTC form listing one or more information items 641 associated with the transaction target 641, one or more information items 643 associated with the user (e.g., initiator/sender), an amount 645, and a message 647 from the user/sender to the other user/recipient. In one embodiment, once the user selects to execute the transaction, for example, "SEND MONEY" at 649, one or more service providers may present one or more authorization requests to the user and/or to the other user for confirmation before the transaction is executed. Moreover, it is noted that various transactions and various financial service providers may have various forms which may comprise various required and/or optional information items therein.

Figure 6F:
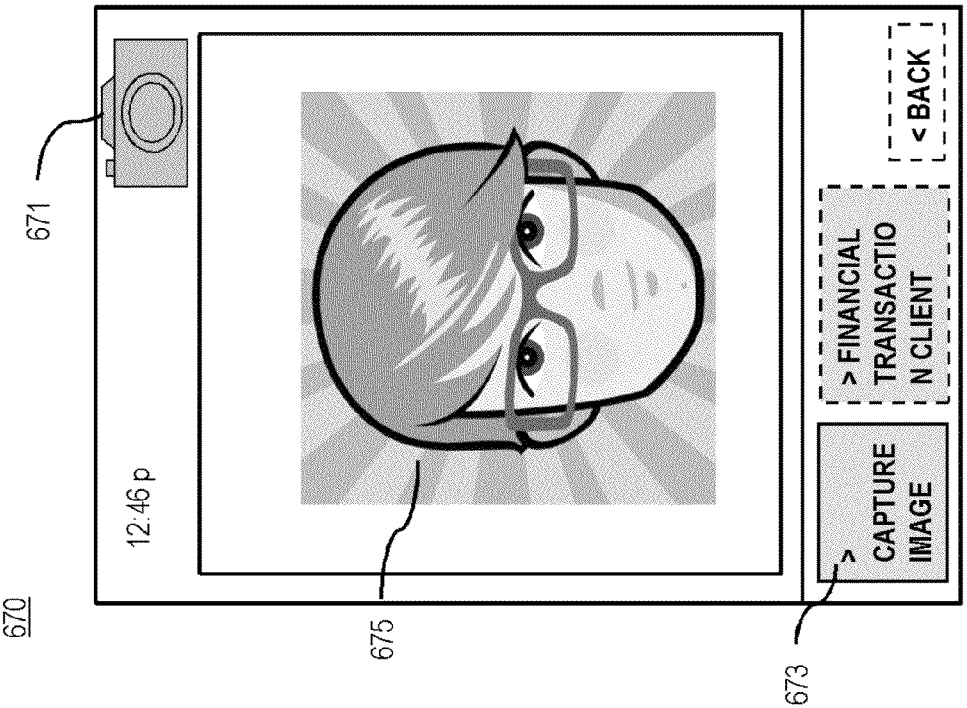
Figure 6G:
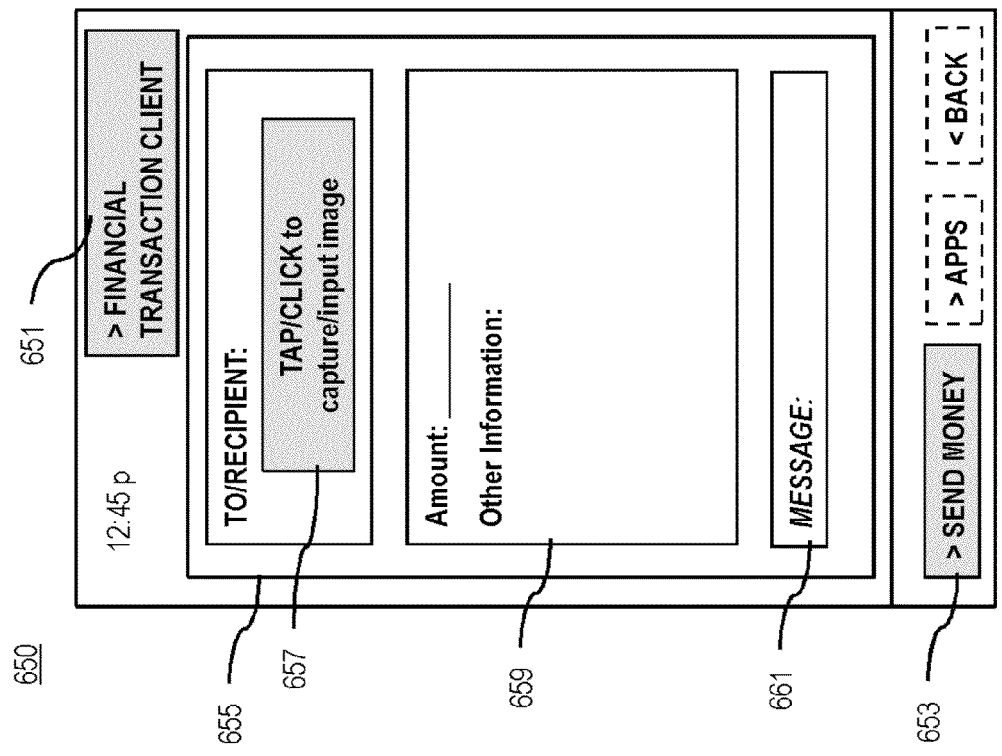
Figure 6H:
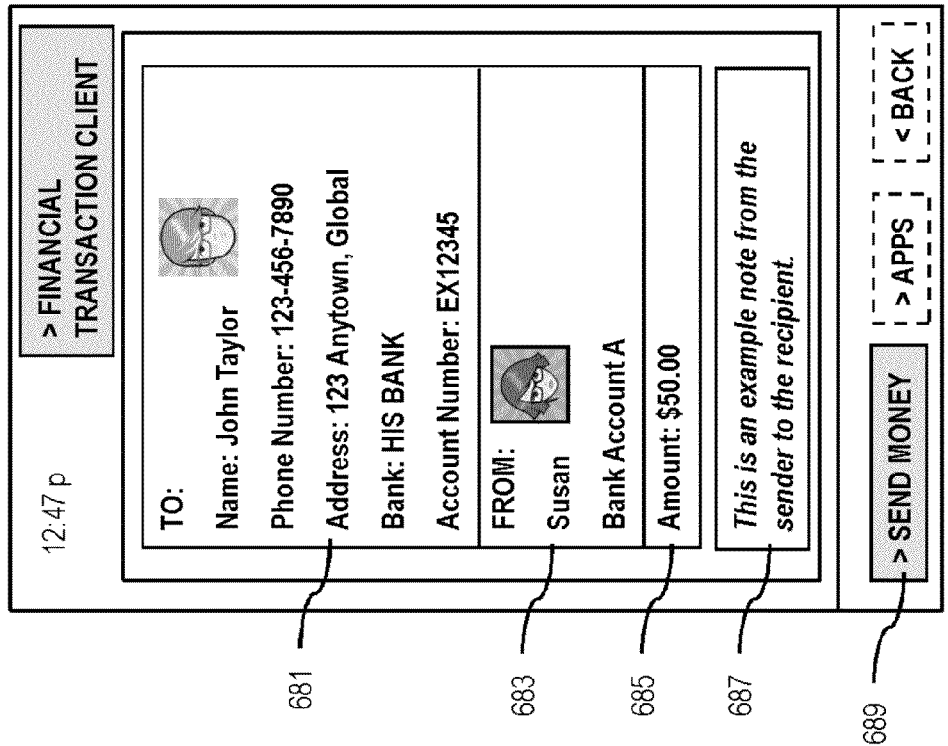

FIG. 6F depicts UI 650 wherein the user of UE 101 launches the FTC 651 on the UE 101 to conduct a financial transaction, for example, "SEND MONEY" at 653. The user is presented with a transaction form 655 for inputting one or more required and optional information. Further, at 657, the user may tap, click, select, etc. to activate a UI option for capturing/inputting one or more images of one or more recipients while one or more other fields 659, 661, and the like may or may not indicate other information at this point of the transaction process. FIG. 6G depicts a UI 670 wherein the user may utilize a camera sensor 671 on the UE 101 to capture 673 an image of another user 675 (e.g., recipient/target). FIG. 6H shows UI 680 wherein the FTC 105 and/or one or more applications 103 retrieve and input one or more information items 681 associated with the image captured in FIG. 6G; for example, from a phonebook on UE 101; and user information 683; for example, from a user profile. Furthermore, the user may input an amount at 685 and a message at 687. At 689, the user may submit the transaction request for sending money to one or more service providers (e.g., financial services 119a) for execution. In various embodiments, the FTC 105 and/or one or more applications at the UE 101 may submit one or more biometric samples (e.g., images) of one or more other users (e.g., persons/recipients) to one or more service providers (e.g., UE 101 may not have the required information), such as the biometric/object recognition platform 111, for analysis and request for any associated information.

FIGS. 7A-7E show renderings of user interfaces on a UE 101 utilized in inputting one or more parameters for one or more transactions, according to various embodiments.

Figure 7B:
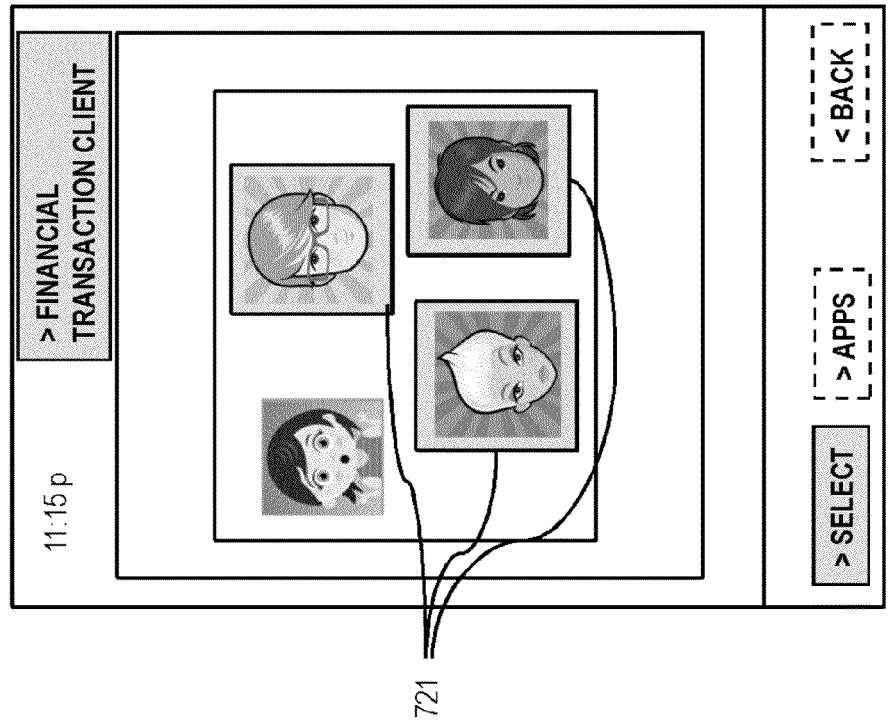
Figure 7A:
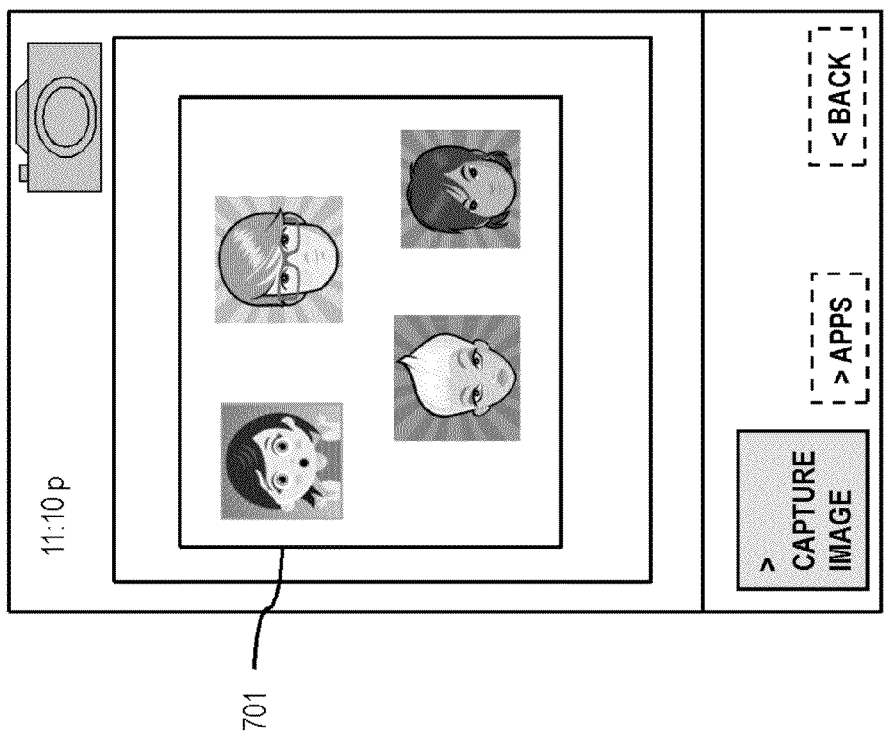
Figure 7C:
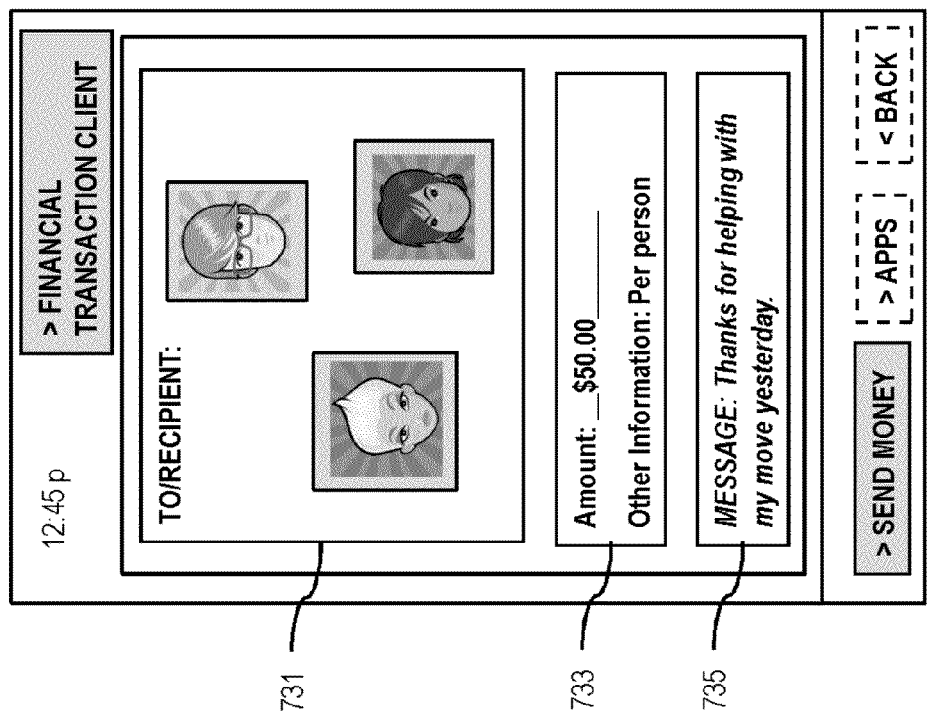

FIG. 7A depicts UI 700 wherein a user of UE 101 captures an image 701 comprising facial pictures of multiple individuals, for example, four individuals. Further, in FIG. 7B, UI 720 shows image 721 wherein the user has selected/highlighted three of the four individuals pictured in the 701 image. Further, in FIG. 7C, UI 730 shows that the user of UE 101 wishes to send an amount of $50.00 at 733 to each person in the image of 731 with a message in 735 (e.g., "thanks for helping with my move yesterday").

Figure 7E:
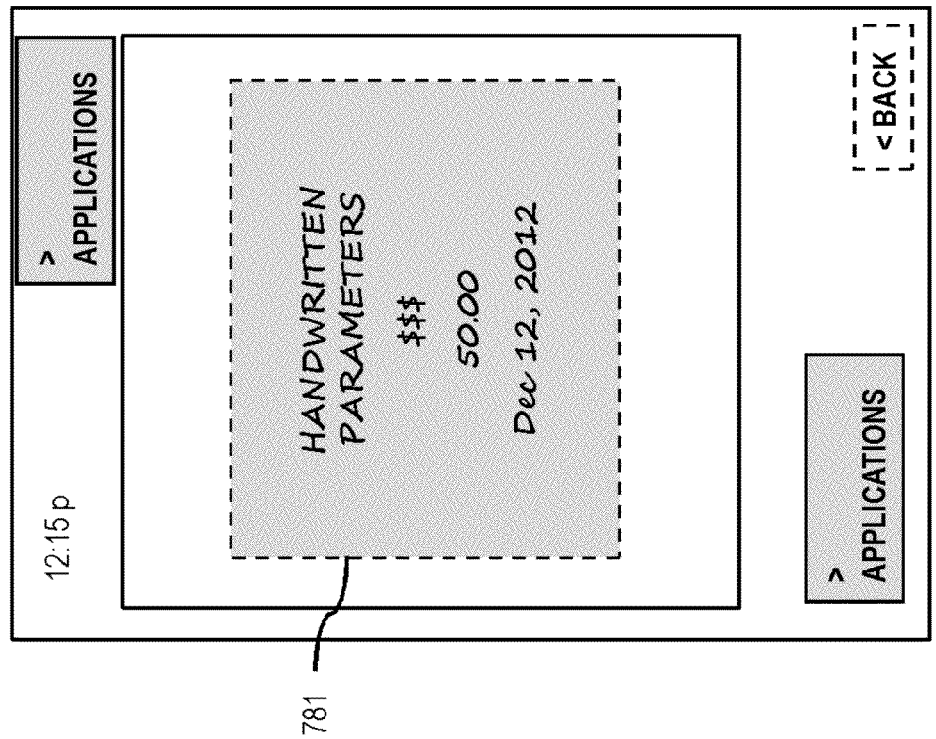

FIG. 7D shows UI 750 and UI 770 which may be utilized in association with the FTC 105 for inputting one or more parameters into the FTC 105. For example, in UI 750 a user may capture image 751 of one or more bank notes and/or coins for indicating one or more amounts (e.g., one or more parameters) associated with one or more financial transactions. Further, in UI 770 a user may capture image 771 of one or more calendar dates for indicating one or more transaction dates. Additionally, FIG. 7E shows UI 780 wherein the user of the UE 101 may input one or more required and/or optional parameters 781 into the FTC 105 and/or into applications 103. For example, the FTC 105 can present one or more input fields in one or more transaction form wherein the user may input one or more monetary amounts, currency types, a calendar date and the like.

As discussed in the various embodiments, a user may utilize one or more biometric samples and/or images of one or more required and/or optional parameters associated with one or more transactions (e.g., financial), wherein one or more information items may be determined from the one or more biometric samples and/or images and substantially automatically input into one or more applications and/or clients via a UE 101. As such, the use of such method could enhance ease of conducting and accuracy of a given transaction.

The processes described herein for utilizing recognition data in conducting service transactions may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
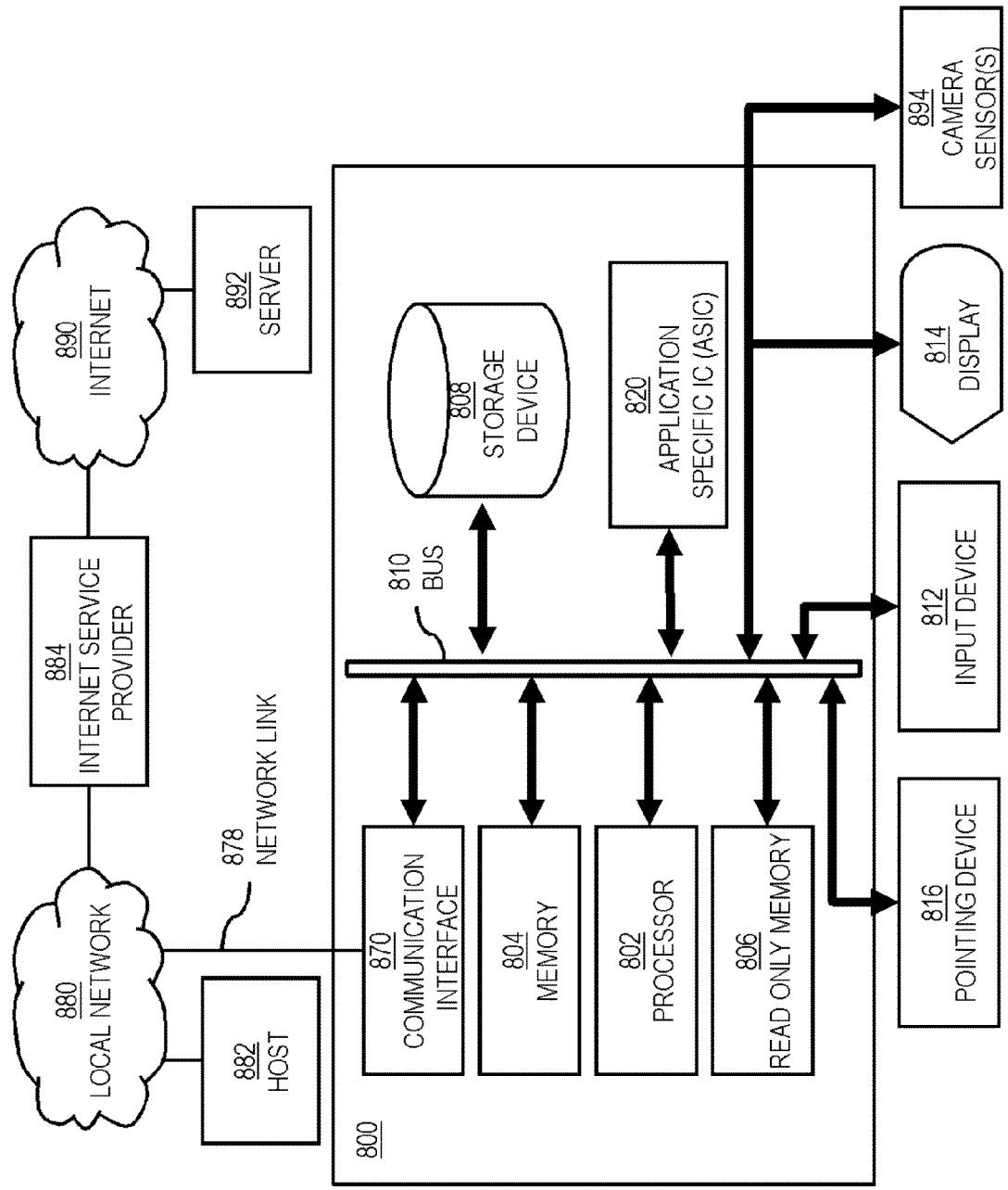
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to utilize recognition data in conducting service transactions as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of utilizing recognition data in conducting service transactions.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to utilizing recognition data in conducting service transactions. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for utilizing recognition data in conducting service transactions. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for utilizing recognition data in conducting service transactions, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, a pointing device 816, such as a mouse or a trackball or cursor direction keys, or motion sensor, for controlling a position of a small cursor image presented on the display 814 and issuing commands associated with graphical elements presented on the display 814, and one or more camera sensors 894 for capturing, recording and causing to store one or more still and/or moving images (e.g., videos, movies, etc.), which also may comprise audio recordings. In some embodiments, for example, in embodiments in which the computer system 800 performs all functions automatically without human input, one or more of external input device 812, display device 814 and pointing device 816 may be omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 109 to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

Figure 9:
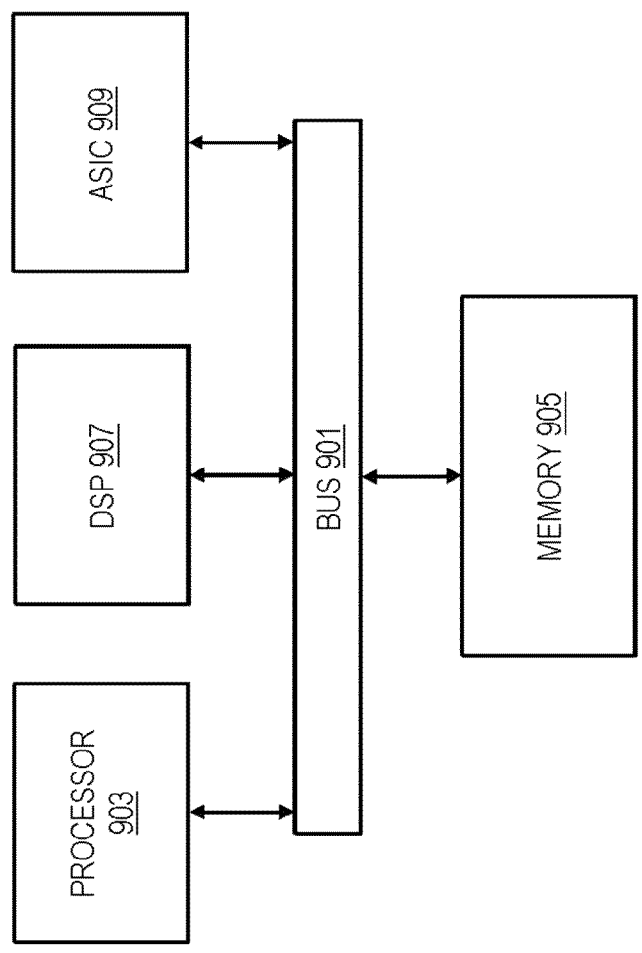
FIG. 9 is a diagram of a chip set that can be used to implement an embodiment of the invention.

FIG. 9 illustrates a chip set or chip 900 upon which an embodiment of the invention may be implemented. Chip set 900 is programmed to utilizing recognition data in conducting service transactions as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of services. Chip set or chip 900, or a portion thereof, constitutes a means for performing one or more steps of utilizing recognition data in conducting service transactions.

In one embodiment, the chip set or chip 900 includes a communication mechanism such as a bus 901 for passing information among the components of the chip set 900. A processor 903 has connectivity to the bus 901 to execute instructions and process information stored in for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide privacy protection for a user when one or more media items are utilized to search for information related to the user. The memory 905 also stores the data associated with or generated by the execution of the inventive steps.

Figure 10:
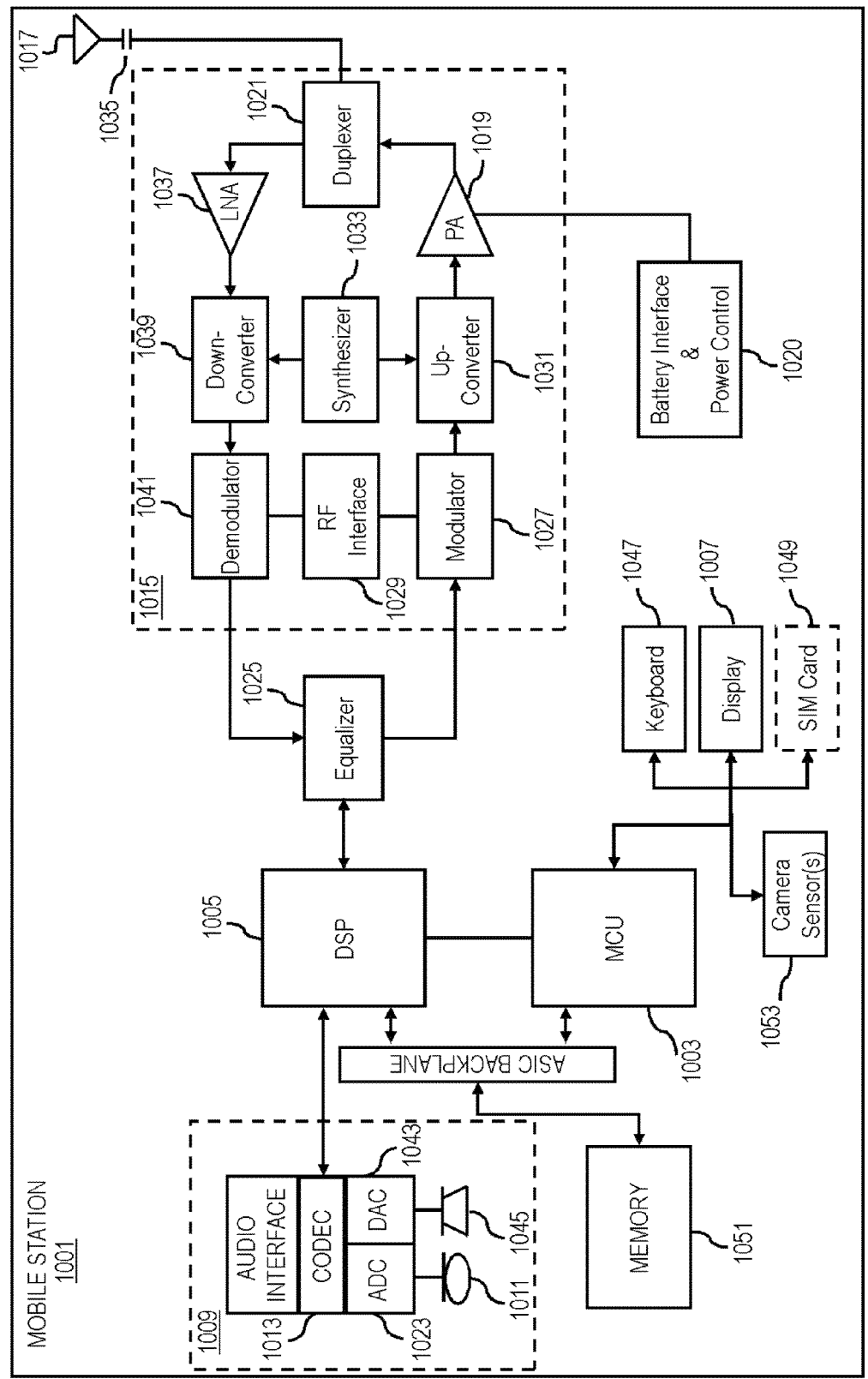
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1000, or a portion thereof, constitutes a means for performing one or more steps of utilizing recognition data in conducting service transactions by setting rules for information sharing and providing information associated with media items. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing privacy protection for a user when media items are utilized to search for information related to the user. The display 907 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match or match, at least in part, impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide privacy protection for a user when media items are utilized to search for information related to the user. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

Further, one or more camera sensors 1053 may be incorporated onto the mobile station 1001 wherein the one or more camera sensors may be placed at one or more locations on the mobile station. Generally, the camera sensors may be utilized to capture, record and cause to store one or more still and/or moving images (e.g., videos, movies, etc.), which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing, by at least one processor, (1) data and/or (2) information and/or (3) at least one signal, the (1) data and/or (2) information and/or (3) at least one signal based, at least in part, on the following:
   a request from a user that includes, at least in part, one or more biometric samples from at least one other user;
   a processing of the one or more biometric samples to cause, at least in part, an identification of at least one parameter based, at least in part, on the one or more biometric samples from the at least one other user; and
   a defining of one or more transactions involving at least the user and the at least one other user based, at least in part, on the at least one parameter.

2. A method of claim 1, wherein at least one of the one or more transactions is between the user and the at least one other user, and
   the at least one parameter includes, at least in part, the user as an initiator of the one or more transactions, the at least one other user that is at least one target of the one or more transactions, or a combination thereof.

3. A method of claim 2, wherein the (1) data and/or (2) information and/or (3) at least one signal are further based, at least in part, on the following:
   a rendering of a user interface for initiating (a) at least one capture of at least one of the one or more biometric samples for identifying the user as the initiator; (b) at least another capture of at least another one of the one or more biometric samples for identifying the at least one other user as the at least one target; or (c) a combination thereof.

4. A method of claim 3, wherein the at least one other user is a plurality of other users, and wherein the at least another capture includes the plurality of other users (a) as a group; (b) as individuals, one or more subgroups, or a combination thereof in separately captured ones of the one or more biometric samples; or (c) as a combination thereof.

5. A method of claim 2, wherein the (1) data and/or (2) information and/or (3) at least one signal are further based, at least in part, on the following:
   a transmission of an authorization request to complete the one or more transactions to the user and/or to the at least one other user for executing the one or more transactions,
   wherein the execution of the one or more transactions is based, at least in part, on one or more responses to the authorization request.

6. A method of claim 5, wherein the (1) data and/or (2) information and/or (3) at least one signal are further based, at least in part, on the following:
   a determination to include one or more messages, one or more links, supplemental information, or a combination thereof, in the one or more responses.

7. A method of claim 2, wherein the (1) data and/or (2) information and/or (3) at least one signal are further based, at least in part, on the following:
   a processing of the identification to determine one or more dates, one or amounts, one or more currency types, or a combination thereof associated with the one or more transactions.

8. A method of claim 1, wherein the identification is performed, at least in part, by utilizing one or more biometric recognition technologies including, at least in part, a facial recognition technology, a voice recognition technology, a finger print recognition technology, or a combination thereof, at a user device, a server, or a combination thereof.

9. A method of claim 1, wherein the (1) data and/or (2) information and/or (3) at least one signal are further based, at least in part, on the following:
   a determination to include identification information, financial information, or a combination thereof associated with the at least one other user, in the at least one parameter, and
   wherein at least a portion of the one or more transactions comprises one or more financial transactions.

10. A method of claim 2, wherein the (1) data and/or (2) information and/or (3) at least one signal are further based, at least in part, on the following:
    an input from the user for selecting at least a portion of the one or more biometric samples that represent the at least one parameter,
    wherein the identification is performed based, at least in part, on the selected at least a portion of the one or more biometric samples.

11. An apparatus comprising:
    at least one processor; and
    at least one memory including computer program code for one or more programs,
    the at least one memory and the computer program code configured to, with the at least one processor, cause the apparatus to perform at least the following,
    determine a request from a user that includes, at least in part, one or more biometric samples from at least one other user;
    process and/or facilitate a processing of the one or more biometric samples to cause, at least in part, an identification of at least one parameter based, at least in part, on the one or more biometric samples from the at least one other user; and
    cause, at least in part, a defining of one or more transactions involving at least the user and the at least one other user based, at least in part, on the at least one parameter.

12. An apparatus of claim 11, wherein the at least one parameter includes, at least in part, the user as an initiator of the one or more transactions, the at least one other user as at least one target of the one or more transactions, or a combination thereof.

13. An apparatus of claim 12, wherein the apparatus is further caused to:
    cause, at least in part, a rendering of a user interface for initiating (a) at least one capture of at least one of the one or more biometric samples for identifying the user as the initiator; (b) at least another capture of at least another one of the one or more biometric samples for identifying the at least one other user as the at least one target; or (c) a combination thereof.

14. An apparatus of claim 13, wherein the at least one other user is a plurality of other users, and wherein the at least another capture includes the plurality of other users (a) as a group; (b) as individuals, one or more subgroups, or a combination thereof in separately captured ones of the one or more biometric samples; or (c) as a combination thereof.

15. An apparatus of claim 12, wherein the apparatus is further caused to:
    cause, at least in part, a transmission of an authorization request to complete the one or more transactions to the user and/or to the at least one other user for executing the one or more transactions, wherein the execution of the one or more transactions is based, at least in part, on one or more responses to the authorization request.

16. An apparatus of claim 15, wherein the apparatus is further caused to:
    determine to include one or more messages, one or more links, supplemental information, or a combination thereof, in the one or more responses.

17. An apparatus of claim 11, wherein the apparatus is further caused to:
    process and/or facilitate a processing of the identification to determine one or more dates, one or amounts, one or more currency types, or a combination thereof associated with the one or more transactions.

18. An apparatus of claim 11, wherein the identification is performed, at least in part, by utilizing one or more biometric recognition technologies including, at least in part, a facial recognition technology, a voice recognition technology, a finger print recognition technology, or a combination thereof.

19. An apparatus of claim 11, wherein at least a portion of the one or more transactions comprises one or more financial transactions.

20. An apparatus of claim 11, wherein the apparatus is further caused to:
    determine an input from the user for selecting at least a portion of the one or more biometric samples that represent the at least one parameter,
    wherein the identification is performed based, at least in part, on the selected at least a portion of the one or more biometric samples.

* * * * *